US006851226B2

(12) United States Patent
MacGregor et al.

(10) Patent No.: US 6,851,226 B2
(45) Date of Patent: Feb. 8, 2005

(54) PARTITION PANEL WITH MODULAR APPLIANCE MOUNTING ARRANGEMENT

(75) Inventors: Bruce G. MacGregor, Palo Alto, CA (US); Juan Carlos Bruce Novoa, Cupertino, CA (US); Larry Cheng, Mountain View, CA (US); Energy Cruse, II, Foster City, CA (US); Thomas B. Eich, Palo Alto, CA (US); Jesse A. Fourt, Palo Alto, CA (US); David M. Gresham, East Grand Rapids, MI (US); Alex T. Grishaver, Daly City, CA (US); Joseph Lishing Hei, Palo Alto, CA (US); Matthew D. Inouye, Foster City, CA (US); Katherine J. Kuchenbecker, Menlo Park, CA (US); James N. Ludwig, East Grand Rapids, MI (US); Sven D. Newman, Menlo Park, CA (US); Todd A. Pelman, San Francisco, CA (US); Alexey Salamini, San Francisco, CA (US); Franz Niklaus Schulz, St. Gallen (CH); Benjamin J. V. Tarbell, Menlo Park, CA (US); Scott A. Whitman, Palo Alto, CA (US); David M. Webster, San Francisco, CA (US)

(73) Assignee: Steelcase Development Corporation, Caledonia, MI (US)

( * ) Notice: Subject to any disclaimer, the term of this patent is extended or adjusted under 35 U.S.C. 154(b) by 0 days.

(21) Appl. No.: 10/076,709

(22) Filed: Feb. 15, 2002

(65) Prior Publication Data

US 2003/0154673 A1 Aug. 21, 2003

(51) Int. Cl.⁷ .................................................. E04H 1/00
(52) U.S. Cl. ........................ 52/36.1; 52/239; 52/220.7
(58) Field of Search ...................... 52/36.1, 239, 220.7, 52/243.1

(56) References Cited

U.S. PATENT DOCUMENTS 405,791 A    6/1889  Moushey (List continued on next page.)

FOREIGN PATENT DOCUMENTS

DE    3003017    7/1981

(List continued on next page.)

OTHER PUBLICATIONS

Exhibit A is a Knoll Currents Price List, Jan. 2001.

(List continued on next page.)

*Primary Examiner*—Carl D. Friedman
*Assistant Examiner*—Basil Katcheves
(74) *Attorney, Agent, or Firm*—Price, Heneveld, Cooper, DeWitt & Litton, LLP

(57) ABSTRACT

A freestanding partition panel for dividing a floor space includes a rigid partition frame having vertical side frame members and first and second horizontal frame members extending between the vertical side frame members to form a vertically enlarged opening through the frame, and an open space within the panel. At least one intermediate horizontal cross member extends across the vertically enlarged opening and defines upper and lower openings through the frame. The intermediate cross member and at least a selected one of the first and second horizontal frame members include a plurality of horizontally spaced apart attachment locations defining a plurality of discrete, serially adjacent mounting spaces. The partition panel further includes a utility unit that is mountable in a selected one of the mounting spaces. The partition panel further includes a first cover panel secured to the partition frame and extending horizontally between the side edge of the utility unit and the selected vertical side frame member. The first cover panel is connected to the intermediate horizontal cross member and extends vertically between the intermediate horizontal cross member and the selected one of the first and second members. A second cover panel is secured to the partition frame, and extends horizontally between the vertical side frame members. The second cover panel extends vertically between the intermediate horizontal cross member and the other of the selected one of the first and second horizontal members.

48 Claims, 30 Drawing Sheets

U.S. PATENT DOCUMENTS

| | | |
|---|---|---|
| 419,521 A | 1/1890 | Heald et al. |
| 783,383 A | 2/1905 | Olson |
| 1,328,677 A | 1/1920 | Hodny |
| 1,476,758 A | 12/1923 | Hodny |
| 1,588,093 A | 6/1926 | Carlson |
| 1,733,107 A | 10/1929 | Ahlberg |
| 1,907,679 A | 5/1933 | Smith |
| 2,027,491 A | 1/1936 | Percy |
| 2,260,178 A | 10/1941 | Guignon, Jr. |
| 2,439,664 A | 4/1948 | Marchand |
| 2,878,955 A | 3/1959 | Hagan |
| 3,004,815 A | 10/1961 | O'Kain et al. |
| 3,121,977 A | 2/1964 | Bersudsky |
| 3,124,328 A | 3/1964 | Kortsch |
| 3,182,805 A | 5/1965 | Foster, Jr. et al. |
| 3,195,698 A | 7/1965 | Cordea |
| 3,212,646 A | 10/1965 | Propst |
| 3,226,468 A | 12/1965 | Patton et al. |
| 3,239,371 A | 3/1966 | Whitney et al. |
| 3,311,340 A | 3/1967 | Riis |
| 3,345,461 A | 10/1967 | Bunting |
| 3,399,856 A | 9/1968 | Pecaut |
| 3,409,261 A | 11/1968 | Leporati |
| 3,462,892 A | 8/1969 | Meyer |
| 3,498,577 A | 3/1970 | Mehr |
| 3,557,499 A | 1/1971 | Dickie et al. |
| 3,620,404 A | 11/1971 | Grasso |
| 3,662,981 A | 5/1972 | Hogrebe |
| 3,685,230 A | 8/1972 | Lickliter et al. |
| 3,805,872 A | 4/1974 | Lorber |
| 3,842,130 A | 10/1974 | Kawaguchi et al. |
| 3,852,935 A | 12/1974 | Jones |
| 3,869,992 A | 3/1975 | Kramer |
| 3,909,912 A | 10/1975 | Kiesling |
| 3,982,370 A | 9/1976 | Buffington |
| 3,986,312 A | 10/1976 | Calhoun et al. |
| 4,025,017 A | 5/1977 | Miller |
| 4,055,329 A | 10/1977 | Hammond |
| 4,135,337 A | 1/1979 | Medlin |
| 4,177,305 A | 12/1979 | Feingold et al. |
| 4,255,611 A | 3/1981 | Propst et al. |
| 4,294,498 A | 10/1981 | Van Luit |
| 4,319,792 A | 3/1982 | Britt et al. |
| 4,365,561 A | 12/1982 | Tellier et al. |
| 4,437,638 A | 3/1984 | Scheibenpflug |
| 4,447,031 A | 5/1984 | Souder, Jr. et al. |
| 4,453,785 A | 6/1984 | Smith |
| 4,463,684 A | 8/1984 | Klungle et al. |
| 4,471,548 A | 9/1984 | Goudie |
| 4,472,860 A | 9/1984 | Österlind |
| 4,516,751 A | 5/1985 | Westbrook |
| 4,535,577 A | 8/1985 | Tenser et al. |
| 4,536,612 A | 8/1985 | Domigan |
| 4,546,708 A | 10/1985 | Wilburth |
| 4,561,619 A | 12/1985 | Robillard et al. |
| 4,562,987 A | 1/1986 | Leeds et al. |
| 4,567,835 A | 2/1986 | Reese et al. |
| 4,577,187 A | 3/1986 | Barr et al. |
| 4,581,858 A | 4/1986 | Clark |
| 4,589,621 A | 5/1986 | Hunt et al. |
| 4,593,227 A | 6/1986 | Bruce et al. |
| 4,603,789 A | 8/1986 | Medlin, Sr. |
| 4,631,881 A | 12/1986 | Charman |
| 4,642,418 A | 2/1987 | Menchetti |
| 4,644,408 A | 2/1987 | Coleman |
| 4,646,211 A | 2/1987 | Gallant et al. |
| 4,656,798 A | 4/1987 | Hazen |
| 4,681,380 A | 7/1987 | Carlin |
| 4,685,255 A | 8/1987 | Kelley |
| 4,708,312 A | 11/1987 | Rohr |
| D295,415 S | 4/1988 | Thies et al. |
| 4,742,979 A | 5/1988 | Syversten et al. |
| 4,759,450 A | 7/1988 | Ball et al. |
| 4,768,744 A | 9/1988 | Leeds et al. |
| 4,783,036 A | 11/1988 | Vossoughi |
| 4,792,881 A | 12/1988 | Wilson et al. |
| 4,814,759 A | 3/1989 | Gombrich et al. |
| 4,826,115 A | 5/1989 | Novitski |
| 4,832,419 A | 5/1989 | Mitchell et al. |
| 4,835,923 A | 6/1989 | Ybarra |
| 4,836,478 A | 6/1989 | Sweere |
| 4,836,486 A | 6/1989 | Vossoughi et al. |
| 4,846,434 A | 7/1989 | Krogsrud |
| 4,852,500 A | 8/1989 | Ryburg et al. |
| 4,852,842 A | 8/1989 | O'Neill |
| 4,874,322 A | 10/1989 | Dola et al. |
| 4,876,835 A | 10/1989 | Kelley et al. |
| 4,882,885 A | 11/1989 | Chatterson et al. |
| 4,905,428 A | 3/1990 | Sykes |
| 4,934,119 A | 6/1990 | Ybarra |
| 4,942,805 A | 7/1990 | Hellwig et al. |
| 4,958,671 A | 9/1990 | Bove |
| 4,964,525 A | 10/1990 | Coffey et al. |
| 4,982,536 A | 1/1991 | Muhlethaler |
| 5,013,112 A | 5/1991 | Hellwig |
| 5,020,293 A | 6/1991 | Itagaki |
| 5,038,539 A | 8/1991 | Kelley et al. |
| 5,044,135 A | 9/1991 | Kroon et al. |
| 5,063,715 A | 11/1991 | Goodman |
| 5,086,597 A | 2/1992 | Kelley et al. |
| 5,108,063 A | 4/1992 | Koerber, Sr. et al. |
| 5,129,200 A | 7/1992 | Kaneko |
| 5,172,529 A | 12/1992 | Van De Riet |
| 5,177,616 A | 1/1993 | Riday |
| 5,177,917 A | 1/1993 | del Castillo Von Haucke |
| 5,207,041 A | 5/1993 | Wills |
| 5,212,915 A | 5/1993 | Antonio |
| 5,214,889 A | 6/1993 | Nienhuis et al. |
| 5,214,890 A | 6/1993 | Levitan et al. |
| 5,255,971 A | 10/1993 | Aisley |
| 5,277,005 A | 1/1994 | Hellwig et al. |
| 5,277,007 A | 1/1994 | Hellwig et al. |
| 5,289,927 A | 3/1994 | Emery |
| 5,321,579 A | 6/1994 | Brown et al. |
| 5,333,416 A | 8/1994 | Harris et al. |
| 5,352,033 A * | 10/1994 | Gresham et al. ............ 312/312 |
| 5,400,993 A | 3/1995 | Hamilton |
| 5,406,760 A | 4/1995 | Edwards |
| 5,421,112 A | 6/1995 | Knorr |
| 5,427,446 A | 6/1995 | Glomski |
| 5,433,046 A * | 7/1995 | MacQuarrie et al. ...... 52/238.1 |
| 5,467,565 A | 11/1995 | Bowman et al. |
| 5,514,004 A | 5/1996 | Swanson |
| 5,518,214 A | 5/1996 | Spencer |
| 5,537,290 A * | 7/1996 | Brown et al. ................ 361/681 |
| 5,577,819 A | 11/1996 | Olsen |
| 5,595,362 A | 1/1997 | Rinderer et al. |
| 5,660,120 A | 8/1997 | Sims |
| 5,675,949 A | 10/1997 | Forslund et al. |
| 5,685,113 A | 11/1997 | Reuter et al. |
| 5,695,356 A | 12/1997 | Swanson |
| 5,707,125 A | 1/1998 | Coglin |
| 5,730,300 A | 3/1998 | Chen |
| 5,744,750 A | 4/1998 | Almond |
| 5,752,357 A | 5/1998 | Piller |
| 5,775,034 A | 7/1998 | Logue |
| 5,778,612 A | 7/1998 | Kissinger et al. |
| 5,784,841 A | 7/1998 | Nowell |
| 5,804,763 A | 9/1998 | Smeenge |
| 5,806,258 A | 9/1998 | Miedema et al. |
| 5,826,385 A | 10/1998 | Dykstra et al. |

| | | | | | | |
|---|---|---|---|---|---|---|
| 5,842,672 A | 12/1998 | Sweere et al. | | 6,129,109 A | 10/2000 | Humber |
| 5,875,594 A | 3/1999 | Hellwig et al. | | 6,152,410 A | 11/2000 | Mark |
| 5,886,295 A | 3/1999 | Carino et al. | | 6,158,180 A | 12/2000 | Edwards |
| 5,893,539 A | 4/1999 | Tran et al. | | 6,170,784 B1 | 1/2001 | MacDonald et al. |
| 5,901,513 A | 5/1999 | Mollenkopf et al. | | 6,173,536 B1 | 1/2001 | Boyce |
| RE36,226 E | 6/1999 | Antonio | | 6,176,729 B1 | 1/2001 | Myers |
| 5,913,787 A | 6/1999 | Edwards | | 6,201,687 B1 * | 3/2001 | Murray ..................... 361/626 |
| D412,167 S | 7/1999 | Rosen | | 6,206,206 B1 | 3/2001 | Saylor et al. |
| 5,918,841 A | 7/1999 | Sweere et al. | | 6,209,836 B1 | 4/2001 | Swanson |
| 5,921,795 A | 7/1999 | Weener et al. | | 6,216,398 B1 | 4/2001 | Shipman et al. |
| 5,927,667 A | 7/1999 | Swanson | | 6,223,478 B1 | 5/2001 | Wheeler |
| 5,931,702 A | 8/1999 | Fladung | | 6,227,499 B1 | 5/2001 | Jennison et al. |
| 5,933,563 A | 8/1999 | Schaffer et al. | | 6,240,234 B1 | 5/2001 | Falkenberg et al. |
| 5,947,429 A | 9/1999 | Sweere et al. | | 6,253,509 B1 * | 7/2001 | Hellwig et al. ............... 52/239 |
| 5,967,479 A | 10/1999 | Sweere et al. | | 6,256,941 B1 | 7/2001 | Yu et al. |
| 5,970,662 A | 10/1999 | Corcorran et al. | | 6,259,020 B1 | 7/2001 | Ashline et al. |
| D416,251 S | 11/1999 | Rosen | | 6,260,324 B1 * | 7/2001 | Miedema et al. .......... 52/481.2 |
| 5,974,753 A | 11/1999 | Hsu | | 6,349,516 B1 * | 2/2002 | Powell et al. ................. 52/239 |
| 5,980,279 A * | 11/1999 | Muller ...................... 439/142 | | D467,555 S * | 12/2002 | King et al. ................. D13/155 |
| 5,992,809 A | 11/1999 | Sweere et al. | | 6,612,077 B2 * | 9/2003 | Parshad ...................... 52/36.5 |
| 5,994,644 A | 11/1999 | Rindoks et al. | | 6,625,935 B1 * | 9/2003 | King et al. ................... 52/36.6 |
| 6,000,180 A | 12/1999 | Goodman et al. | | | | |
| 6,010,099 A | 1/2000 | Wertz et al. | | | | |
| 6,012,258 A | 1/2000 | Brown et al. | | | | |
| 6,015,120 A | 1/2000 | Sweere et al. | | | | |
| 6,017,228 A | 1/2000 | Verbeek et al. | | | | |
| 6,019,321 A | 2/2000 | Carlson, Jr. et al. | | | | |
| 6,019,332 A | 2/2000 | Sweere et al. | | | | |
| 6,023,893 A | 2/2000 | Tanaka | | | | |
| 6,052,958 A | 4/2000 | Miedema et al. | | | | |
| 6,094,875 A | 8/2000 | Laine | | | | |
| 6,100,942 A | 8/2000 | Hollenbaugh et al. | | | | |
| 6,101,773 A * | 8/2000 | Chau et al. ................. 52/220.7 | | | | |
| 6,102,348 A | 8/2000 | O'Neill | | | | |
| 6,115,978 A * | 9/2000 | Bastian et al. ............. 52/243.1 | | | | |
| 6,128,877 A | 10/2000 | Goodman et al. | | | | |

FOREIGN PATENT DOCUMENTS

| | | |
|---|---|---|
| DE | 3120723 | 3/1983 |
| DE | 0256160 | 2/1988 |
| EP | EP 0145410 | 6/1985 |
| WO | WO 0021412 | 4/2000 |

OTHER PUBLICATIONS

Exhibit B is promotional material describing SMED International Office Furniture published at least as early as Feb. 14, 2001.

* cited by examiner

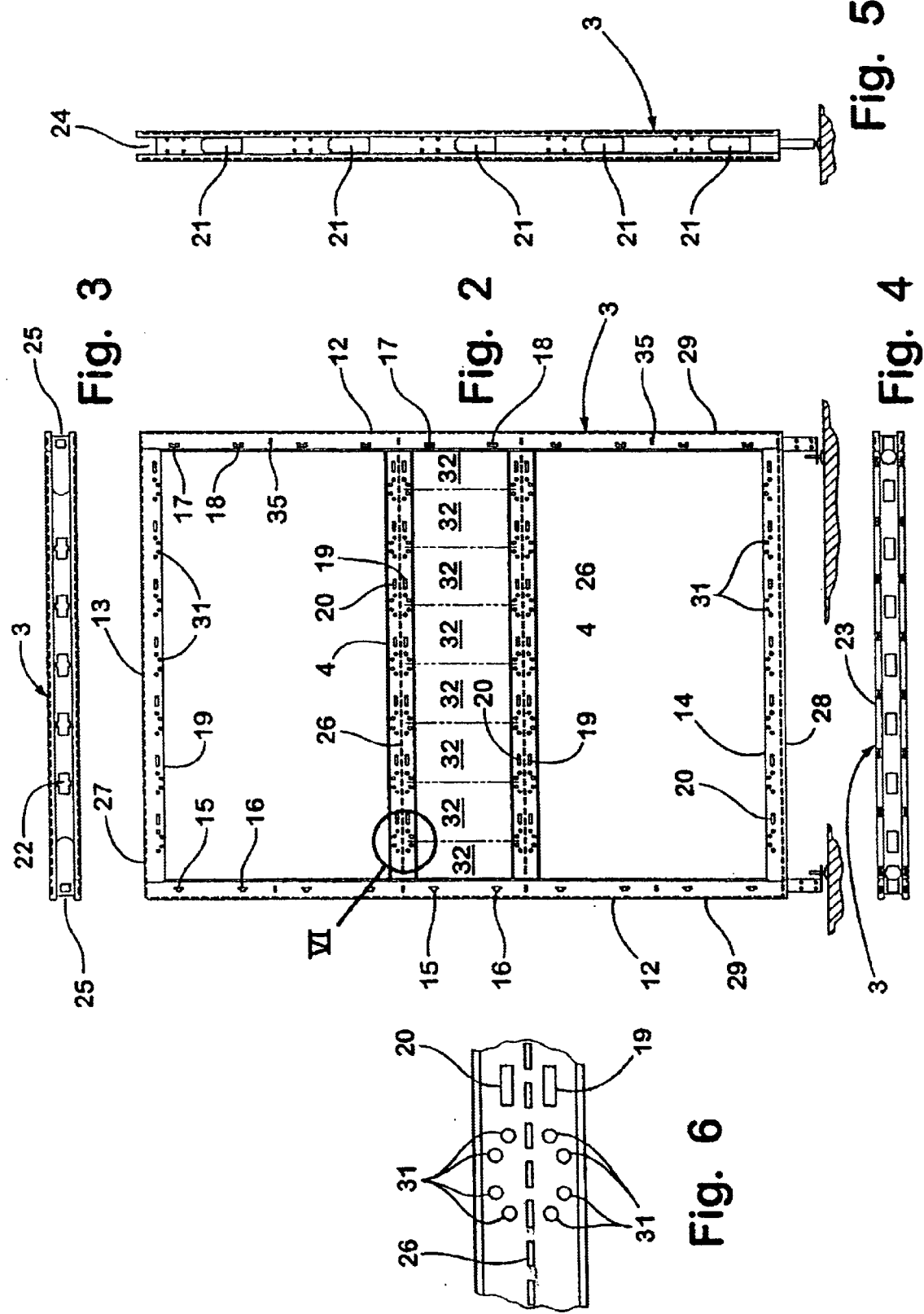

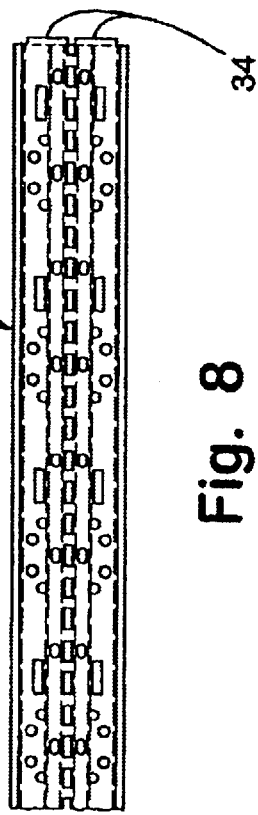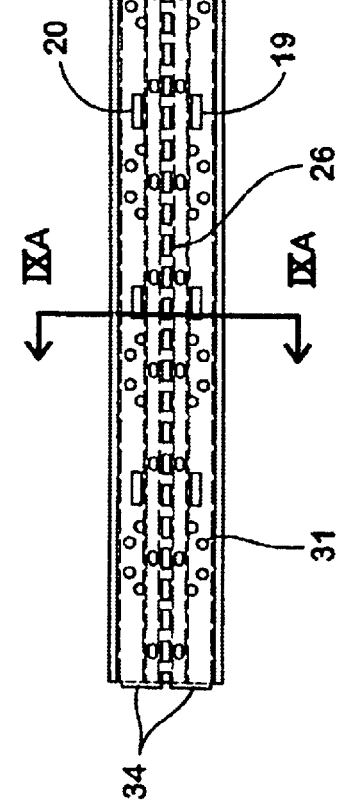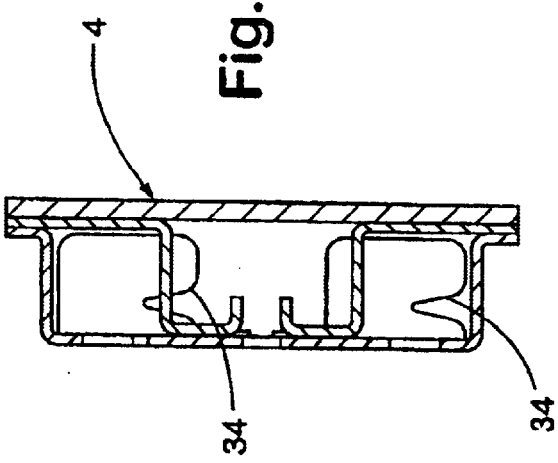
Fig. 7
Fig. 8
Fig. 9A

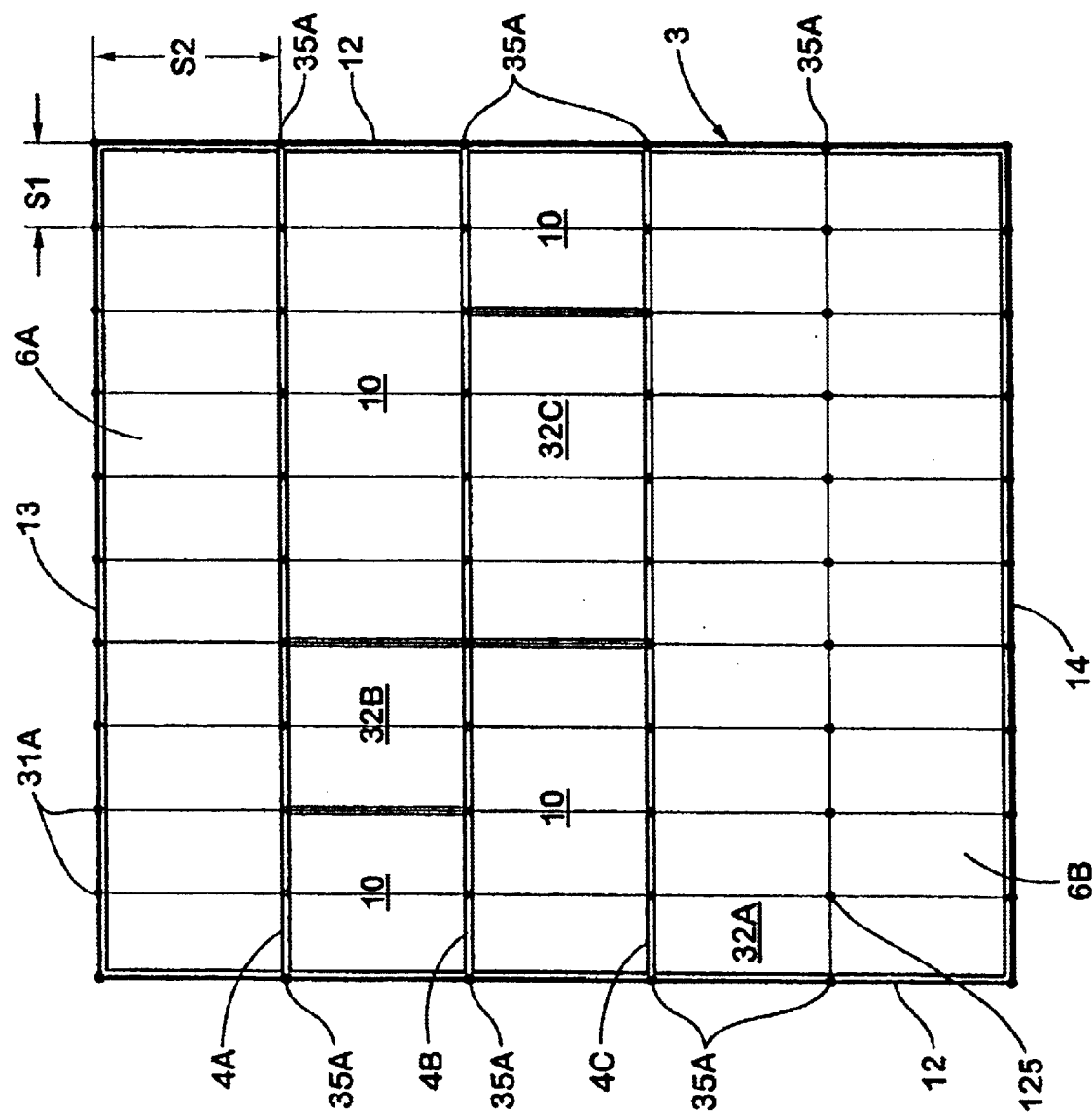

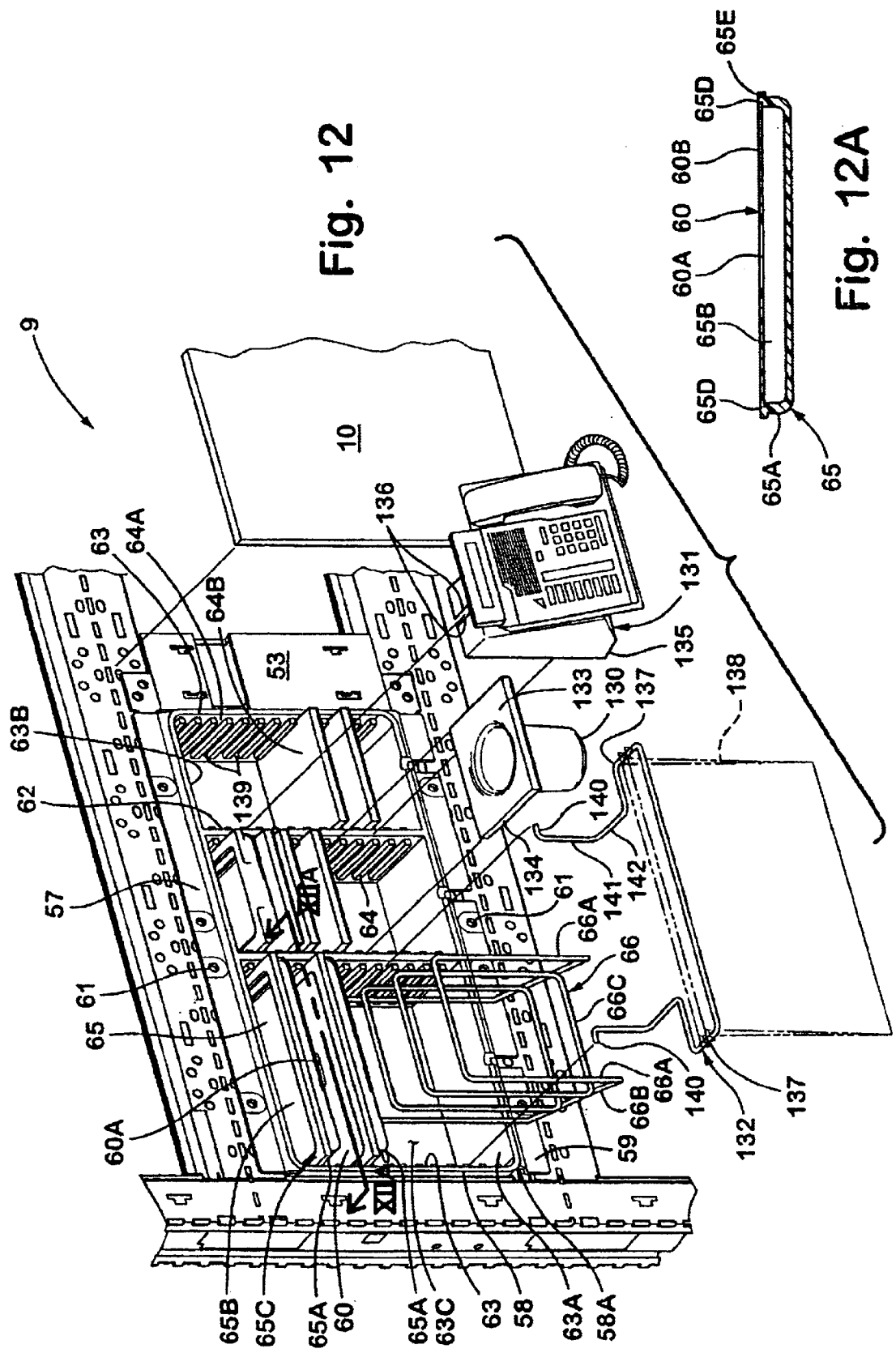

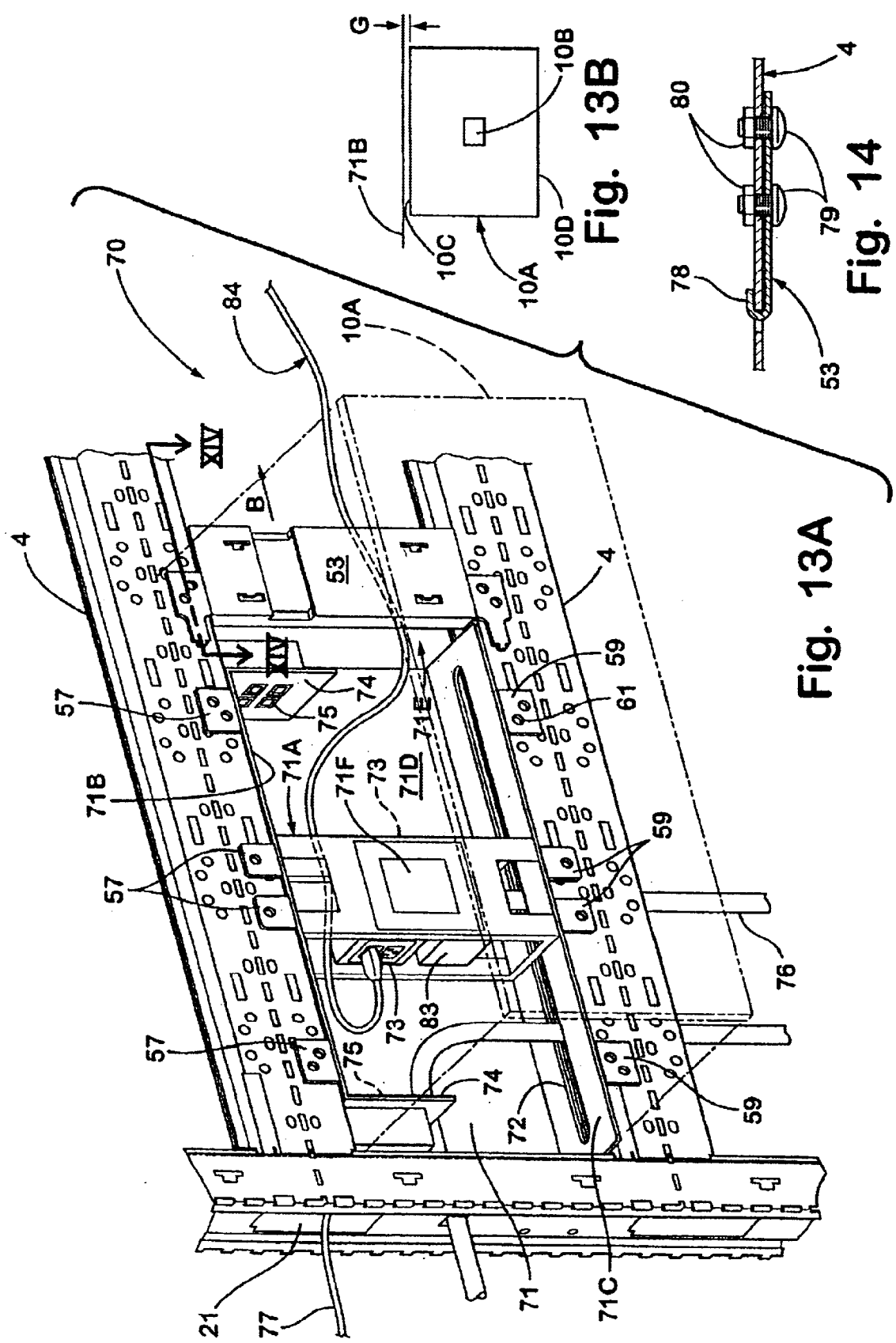

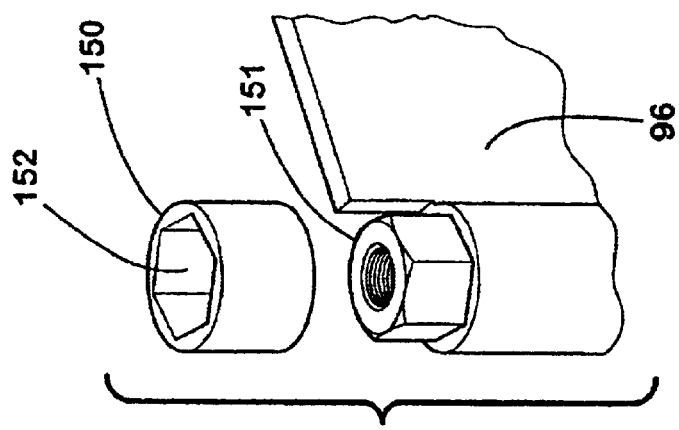
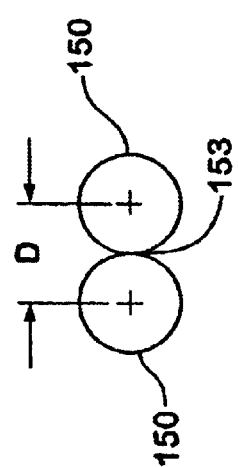
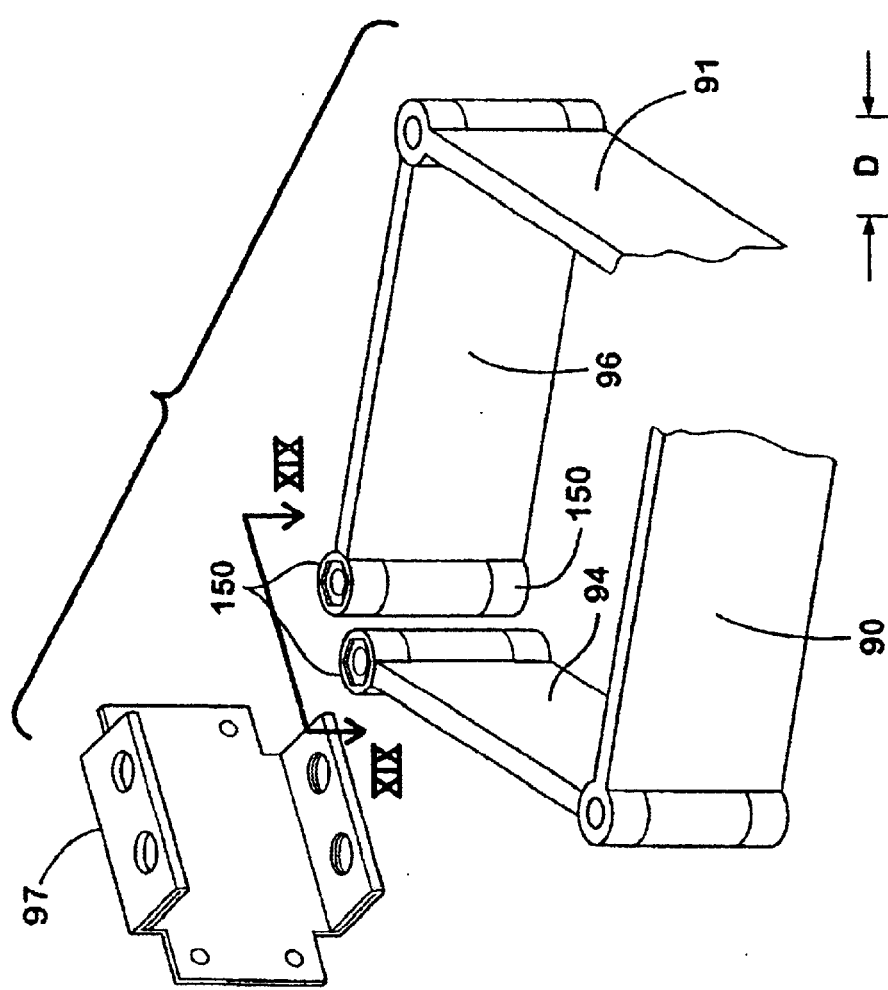

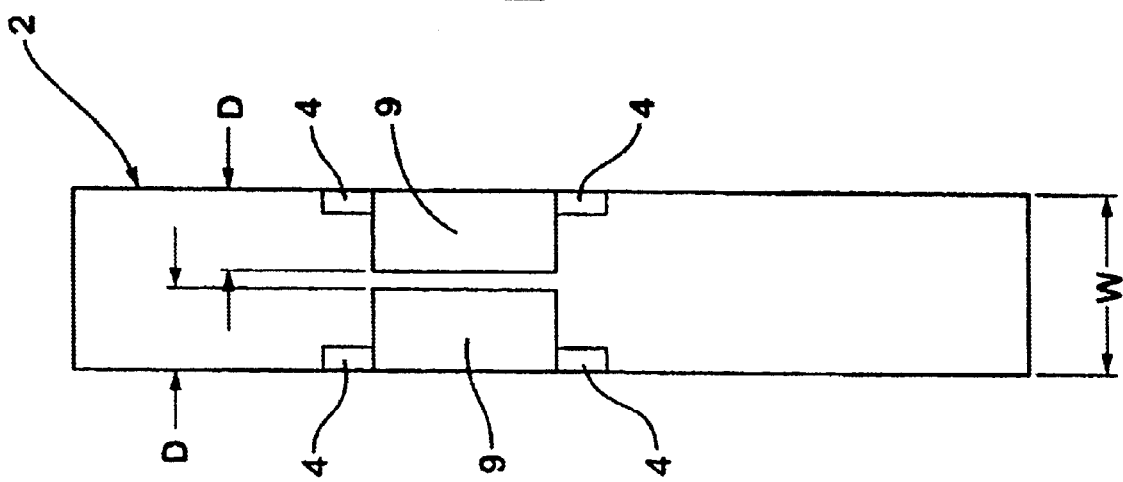

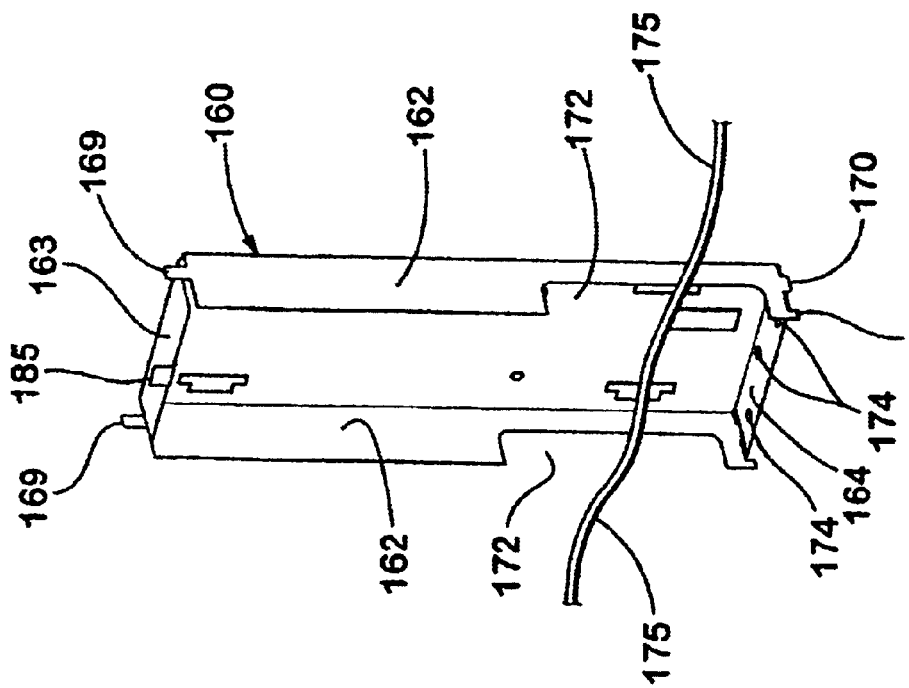
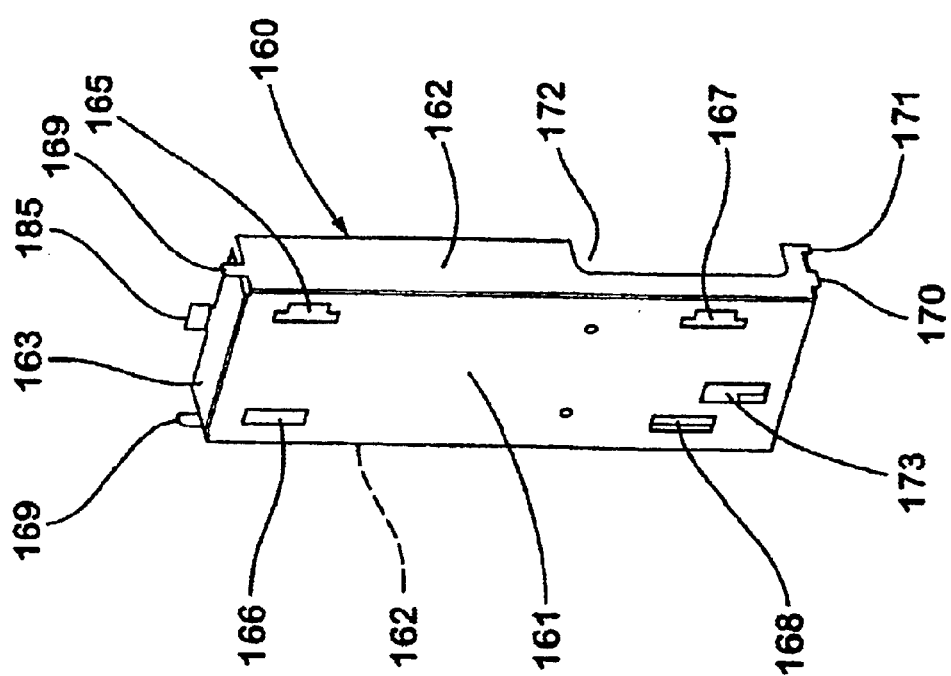

PARTITION PANEL WITH MODULAR APPLIANCE MOUNTING ARRANGEMENT

BACKGROUND OF THE INVENTION

The present invention relates to open office plans and the like.

The efficient use of building floor space is an ever-growing concern, particularly as building costs continue to escalate. Open office plans have been developed to reduce overall officing costs, and generally incorporate large, open floor spaces in buildings that are equipped with modular furniture systems which are readily reconfigurable to accommodate the ever-changing needs of a specific user, as well as the divergent requirements of different tenants. One arrangement commonly used for furnishing open plans includes movable partition panels are detachably interconnected to partition off the open spaces into individual workstation and/or offices. Such partition panels are configured to receive hang-on furniture units, such as worksurfaces, overhead cabinets, shelves, etc., and are generally known in the office furniture industry as "systems furniture". Another arrangement for dividing and/or partitioning open plans includes modular furniture arrangements, in which a plurality of differently shaped, freestanding furniture units are positioned in a side-by-side relationship, with upstanding privacy screens attached to at least some of the furniture units to create individual, distinct workstations and/or offices. Both of these types of modular furniture systems, as well as others, have been widely received due largely to their ability to be readily reconfigured and/or moved to a new site, since they are not part of a permanent leasehold improvement.

At present, some types of furniture systems utilize vertical rows of slots to support hang-on furniture units. Also, systems have been developed that utilize horizontal rows of slots for supporting hang-on furniture units such as storage units, worksurfaces and the like. Existing furniture systems commonly include cover panels that are attached to a partition frame to close off the frame and provide visual and audio privacy for the worker. However, existing furniture systems may not provide sufficient flexibility to permit the location of the hang-on furniture units to be readily adjusted. Furthermore, positioning of the cover panels on existing systems may be problematic.

Considerable efforts have been made to provide the users of such furniture systems with power and/or data connections for users of the system. Existing systems typically include worksurfaces that are utilized to support various accessories such as phones, computer monitors, printers and the like. In general, the worksurfaces must be relatively large to support such equipment, such that the overall size or "footprint" of the workspace for a given user will be quite large. The relatively large footprint requires more floor space, leading to more cost per user.

SUMMARY OF THE INVENTION

One aspect of the present invention is a freestanding partition panel for dividing a floor space. The partition panel includes a rigid partition frame having horizontally spaced apart vertical side frame members and vertically spaced apart first and second horizontal frame members extending between the vertical side frame members to form a generally quadrilateral vertically enlarged opening through the frame, and defining an open space within the panel. The partition panel includes at least one intermediate horizontal cross member extending across the vertically enlarged opening and defining an upper opening through the frame above the intermediate horizontal cross member, and defining a lower opening through the frame below the intermediate horizontal cross member. The intermediate cross member and at least a selected one of the first and second horizontal frame members include a plurality of horizontally spaced apart attachment locations defining a plurality of discrete, serially adjacent mounting spaces in a selected one of the upper and lower openings through the frames within the open space. The partition panel further includes a utility unit connectable to selected ones of the attachment locations of the intermediate horizontal cross member and the selected one of the first and second horizontal members, such that the utility unit can be mounted in a selected one of the mounting spaces. The utility unit has a side edge spaced apart from a selected one of the vertical side frame members. The partition panel further includes a first cover panel secured to the partition frame and extending horizontally between the side edge of the utility unit and the selected vertical side frame member. The first cover panel is connected to the intermediate horizontal cross member and extends vertically between the intermediate horizontal cross member and the selected one of the first and second members. A second cover panel is secured to the partition frame, and extends horizontally between the vertical side frame members. The second cover panel extends vertically between the intermediate horizontal cross member and the other of the selected one of the first and second members.

Another aspect of the present invention is a freestanding partition panel for dividing floor space. The partition panel includes a rigid partition frame having first and second horizontally spaced apart vertical side frame members, and elongated vertically spaced apart first and second horizontal members extending between the vertical side frame members to define an open space within the panel. The first and second horizontal members include a plurality of horizontally spaced apart attachment locations defining a plurality of discrete, serially adjacent mounting spaces within the open space. A utility unit is connectable to selected ones of the attachment locations of the first and second horizontal members, and extends vertically between the first and second horizontal members. The utility unit defines a generally vertical side edge that is horizontally spaced apart from the first vertical side frame member to define a gap therebetween. A cover panel is secured to the partition frame, and has a first vertical side edge proximate the vertical side edge of the utility unit, and a second vertical side edge proximate the first vertical side frame member. The cover panel is secured to the first and second horizontal members and extends therebetween to substantially close off the gap.

Yet another aspect of the present invention is a method of configuring a partition panel. The method includes providing a freestanding partition frame defining horizontally spaced apart vertical side faces and an interior space between the vertical side faces. The partition frame has first and second generally vertical side edges that are horizontally spaced apart to define a frame width. The partition frame has generally horizontal upper and lower edges defining a generally quadrilateral perimeter with the vertical side edges. The method includes dividing at least a portion of the interior space into a plurality of serially adjacent mounting spaces defining a horizontal row. The mounting spaces each have substantially the same size and configuration. A plurality of utility units is provided, each configured to be mounted into a selected one of the mounting spaces at a selected horizontal position. The utility units have an exterior side surface that faces outwardly, and a generally vertical side edge and generally horizontal upper and lower side edges defining a height. The utility unit is secured to the partition frame in a selected one of the mounting spaces at a selected horizontal position with the vertical side edge of the utility unit spaced inwardly from the first vertical side edge of the partition frame to form a first gap defining a width that is substantially less than the frame width. The upper side edge of the utility unit is spaced downwardly from the upper edge of the partition frame to form an upper gap having a width about the same as the frame width. The lower side edge of the utility unit is spaced upwardly from the lower edge of the partition frame to form a lower gap having a width about the same as the frame width. A first cover panel having a width substantially equal to the first gap is provided. The first cover panel has a height substantially the same as the height of the utility unit. The first cover panel is installed to the partition frame to substantially close off the first gap. An upper cover panel is installed to the frame to substantially close off the upper gap, and a lower cover panel is secured to the partition frame to substantially close off the lower gap.

Yet another aspect of the present invention is a flat display screen for mounting to partitions. The arrangement includes a flat display screen adapted to provide images. First and second support arms each have first and second links pivotably interconnected. Each first link has an end adapted to be pivotably mounted to a partition for pivoting about a substantially vertical axis. Each second link has an end pivotably connected to the display screen, and the first and second support arms support the display screen for movement in the horizontal direction between a stored position and a use position.

These and other features, advantages, and objects of the present invention will be further understood and appreciated by those skilled in the art by reference to the following written specification, claims, and appended drawings.

BRIEF DESCRIPTION OF THE DRAWINGS

FIG. 2 is a front elevational view of a partition frame;

FIG. 3 is a top plan view of the partition frame of FIG. 2;

FIG. 4 is a bottom plan view of the partition frame of FIG. 2;

FIG. 5 is a right elevational view of the partition frame of FIG. 2;

FIG. 6 is an enlarged view of a portion of the partition frame of FIG. 2;

FIG. 7 is a fragmentary, top plan view of a structural intermediate horizontal beam;

FIG. 8 is a front elevational view of the structural intermediate beam of FIG. 7;

FIG. 9A is a cross-sectional view taken along the line IX—IX; FIG. 8;

FIG. 9B is a schematic view of the partition frame of FIG. 2;

FIG. 12 is a fragmentary, perspective view of a modular appliance unit having storage features;

FIG. 12A is a cross-sectional view of a tray and lid taken along the line XIIA—XIIA; FIG. 12;

FIG. 13A is a fragmentary view of a modular appliance unit having power and data outlets and wire management features;

FIG. 13B is a schematic view of the cover panel that may be utilized to close off the modular appliance unit of FIG. 13A;

FIG. 14 is a fragmentary view of the cover panel mounting bracket of FIG. 13 taken along the line XIV—XIV;

FIG. 18 is a fragmentary, exploded, perspective view of a portion of the arm assemblies of FIG. 15;

FIG. 19 is a schematic top view of the friction rollers of FIG. 18;

FIG. 20 is an exploded, fragmentary, perspective view showing the friction rollers of FIG. 18;

FIG. 21 is a schematic end view of a partition panel showing a pair of modular appliance units mounted on opposite side of the partition panel;

FIG. 22 is a perspective view of a second embodiment of a cover panel mounting bracket;

FIG. 23 is a perspective view of a second embodiment of a cover panel mounting bracket;

DETAILED DESCRIPTION OF PREFERRED EMBODIMENT

The present application is related to co-pending patent application Ser. No. 10/077,553 entitled PANEL SYSTEM, filed on even date herewith, the entire contents of which are hereby incorporated by reference.

Figure 1:
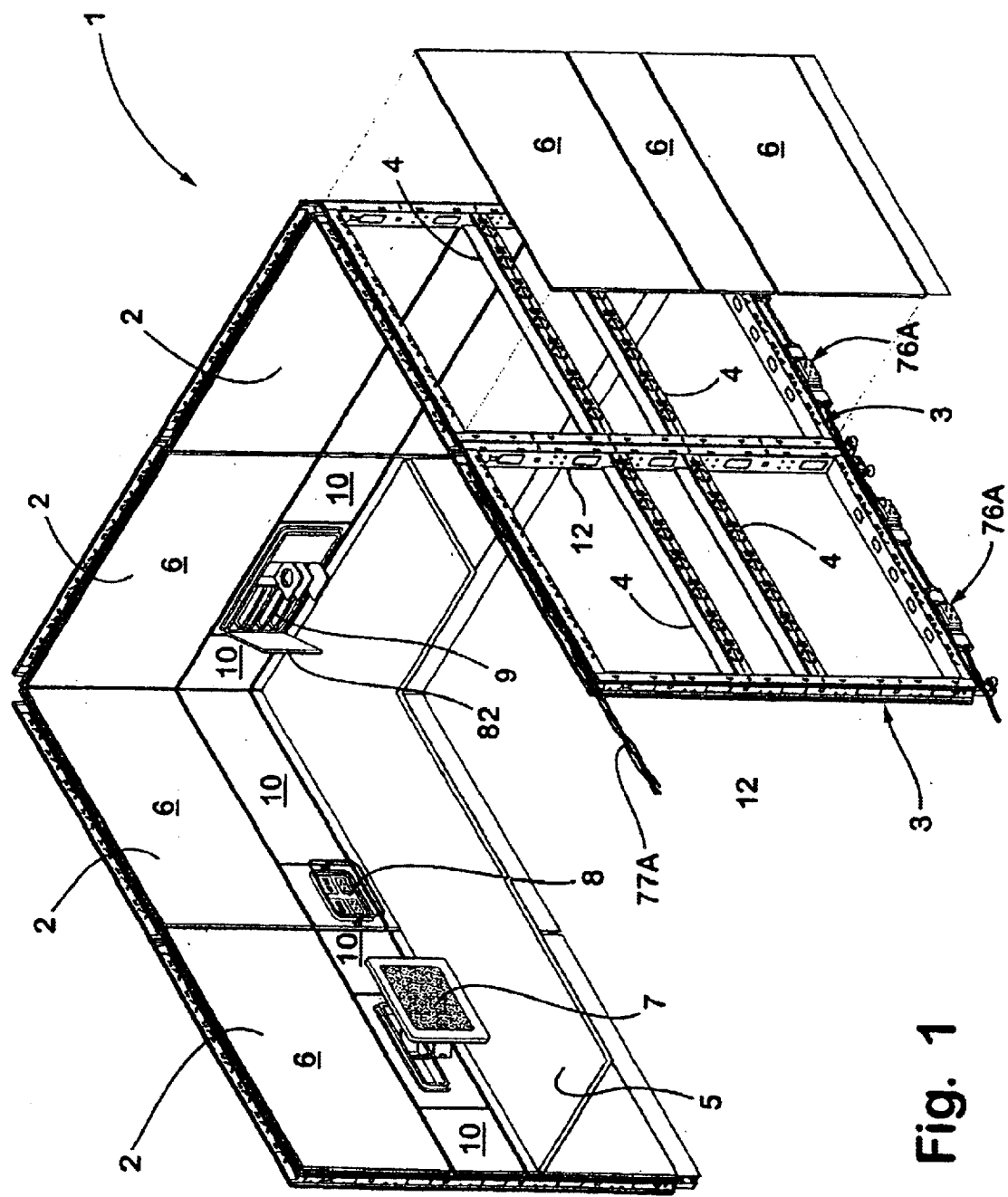
FIG. 1 is a partially exploded, perspective view of a partition panel system with a modular appliance mounting arrangement embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIG. 1) designates a partition system 1 including a plurality of partition panels 2. Each of the partition panels 2 includes a partition frame 3, each of which may include one or more intermediate beams 4, and one or more cover panels 6. One or more modular appliance units such as a flat screen monitor 7, power module 8, or storage module 9 may be mounted to the intermediate beams 4 and/or horizontal frame members 13, 14 at a selected horizontal location. In addition to the full width "segmented" cover panels 6, one or more smaller width cover panels 10 may be utilized to close off the gap that would otherwise exist adjacent the modular accessory units 7, 8, and 9. Cover panels 10 have the same height as the modular accessory units, and a width as required to close off the gap between the vertical side edge of the modular accessory unit and an adjacent vertical frame member 12. If required for a particular application, a plurality of modular accessory units may be mounted to the frame in a side-by-side manner extending across the entire width of the frame 3, such that smaller cover panels 10 are not required. Although the modular accessory units 7, 8 and 9 are illustrated as being positioned at the same height, as described in more detail below, the accessory units may be positioned at various different heights as required by the user.

Figure 1B:
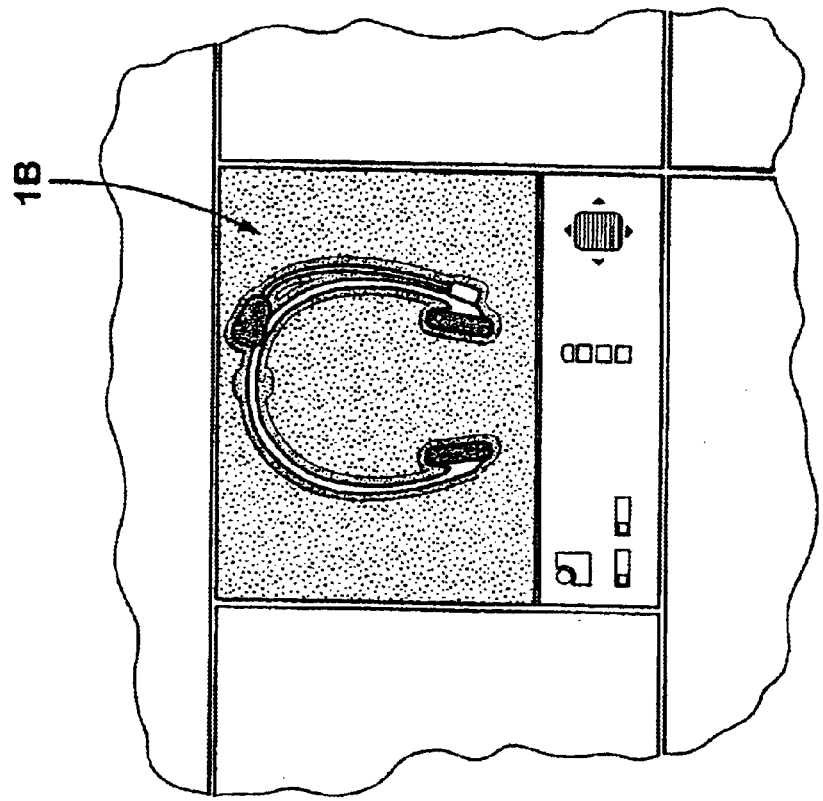
FIGS. 1A–1AE are perspective views of modular appliance units according to the present invention.
Figure 1A:
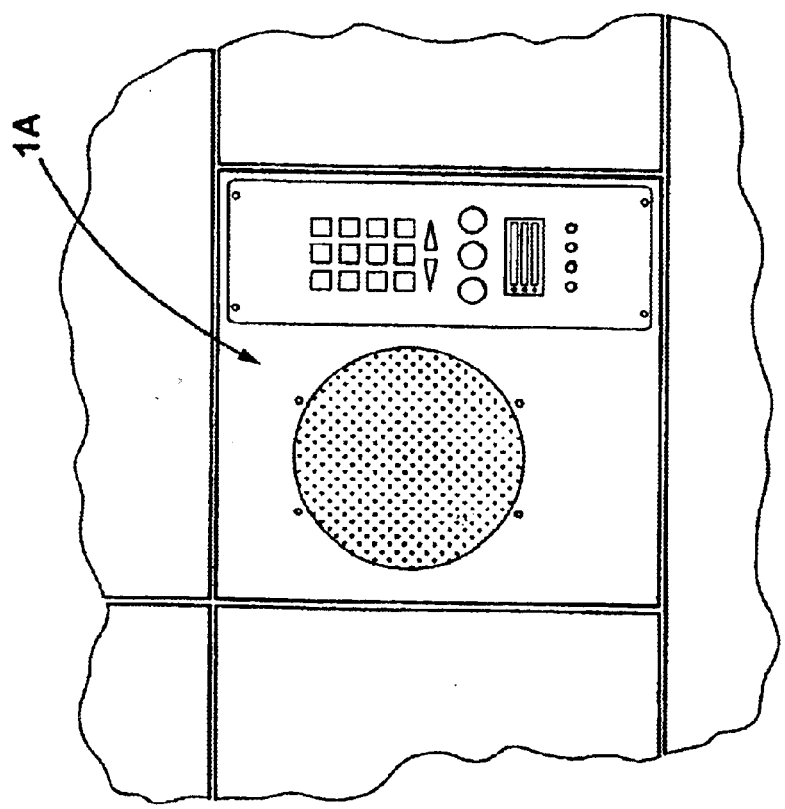
Figure 1D:
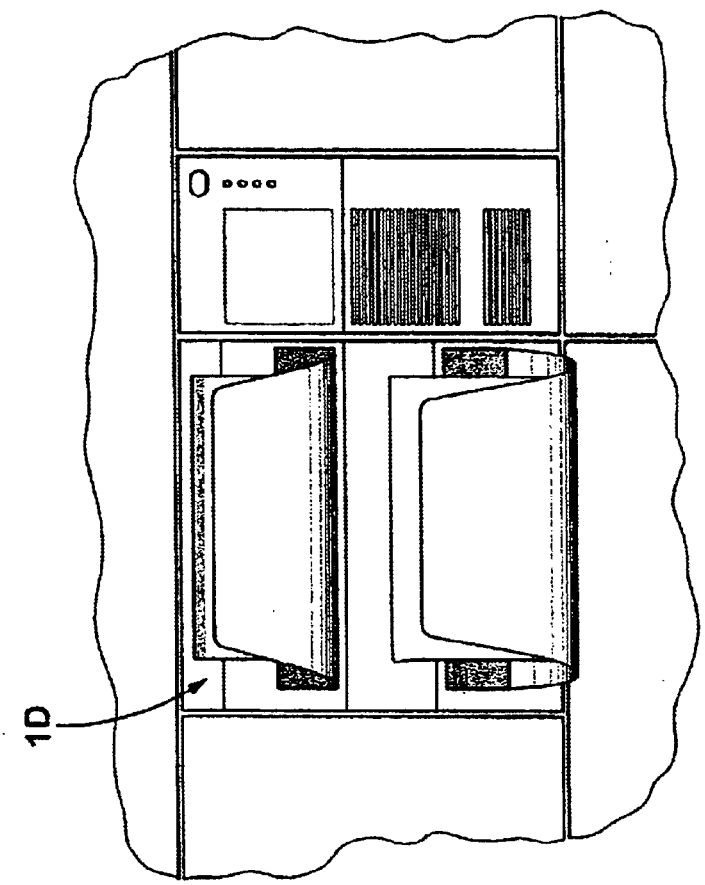
Figure 1C:
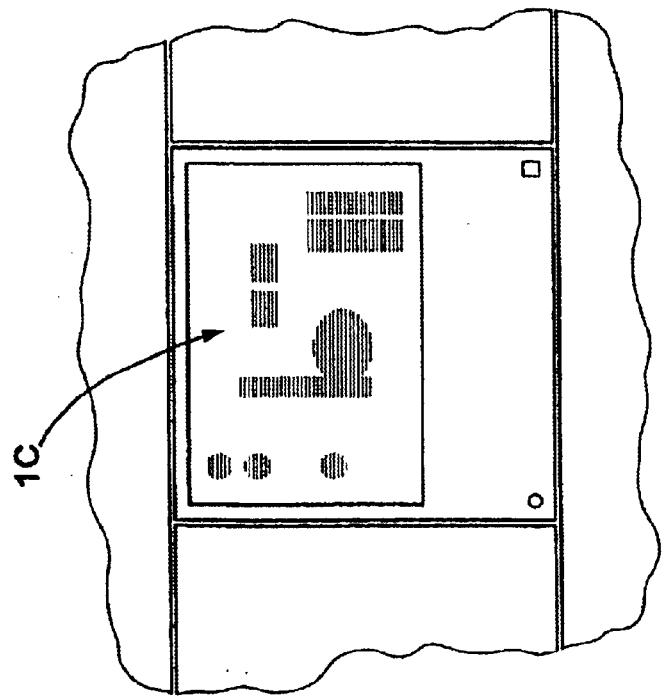

In addition to the flat screen modular accessory unit 7, power and data modular accessory unit 8, and storage modular accessory unit 9, additional modular accessory units may be utilized to provide a wide variety of features to enhance the work environment. Various modular accessory units according to the present invention are illustrated in FIGS. 1A–1AE. The modular accessory units may comprise various high tech devices to facilitate data flow through the adjacent work areas and the like. Other electronic modular accessory units may be utilized to control the temperature, noise, or other environmental conditions within the work area to thereby optimize a user's comfort and productivity. A modular appliance unit comprising "Polycom"—style voice conferencing system 1A suitable for small group space is illustrated in FIG. 1A, and an integrated Plantronics-style wireless headset 1A that reduces clutter from around the phone is illustrated in FIG. 1B. A small touchscreen appliance 1C for the communication of graphic, video and audio data is illustrated in FIG. 1C, and a modular accessory unit with an integrated, vertically oriented printer 1D for personal printing is illustrated in FIG. 1D. The data lines for the printer may be routed within the panel to the computer. The printer permits convenient, private printing of documents.

Figure 1F:
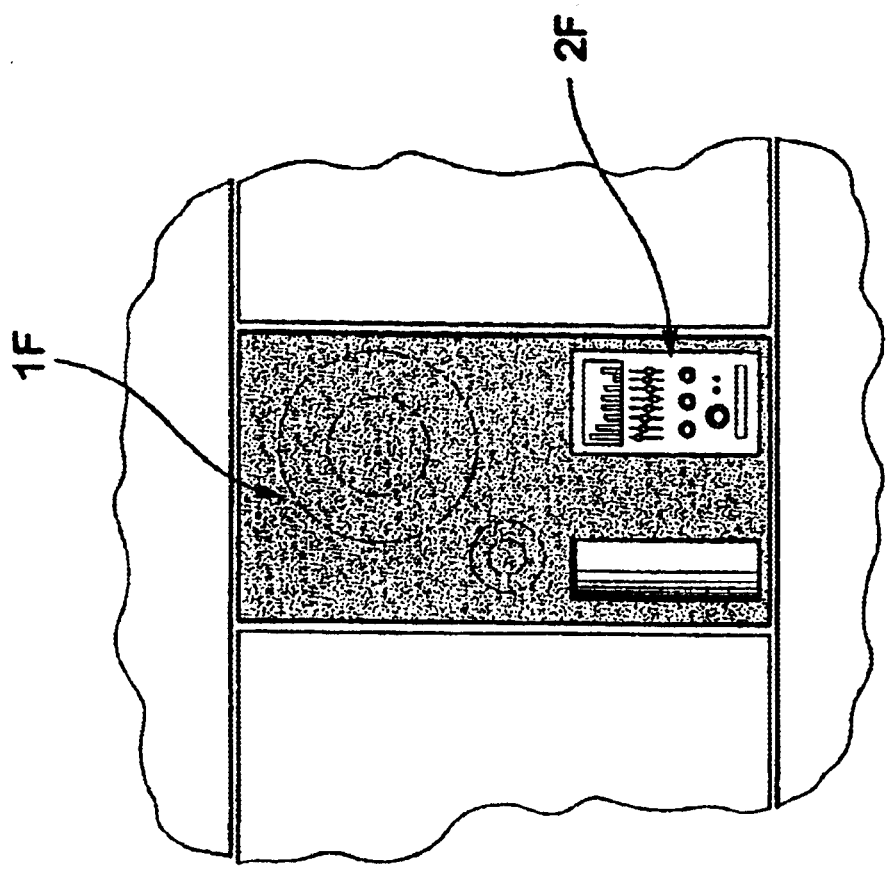
Figure 1E:
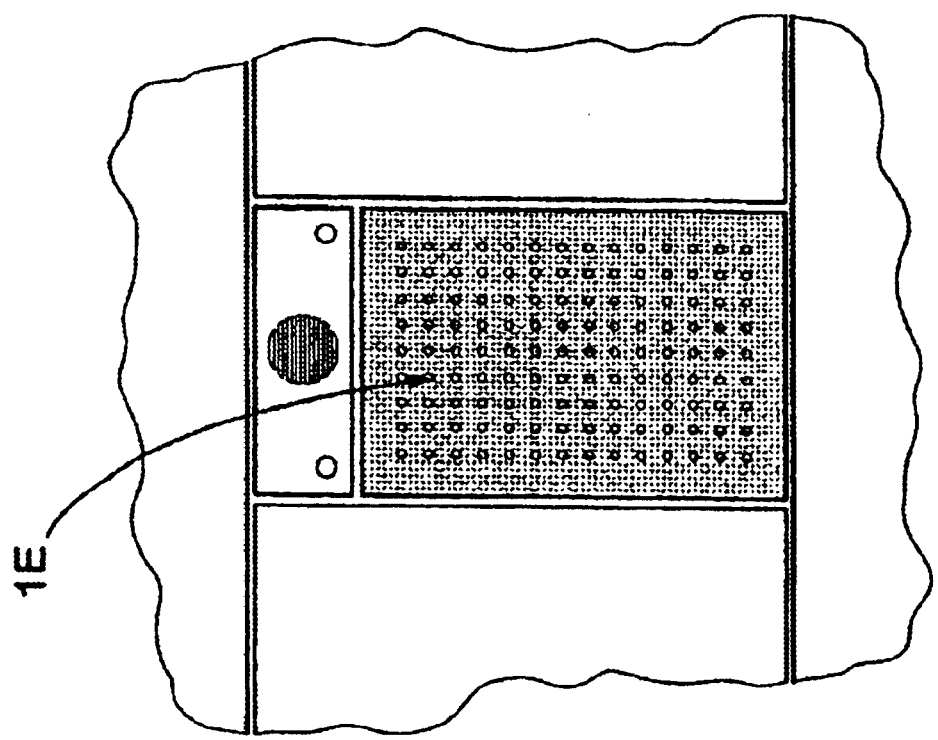

Modular appliance units for controlling noise within the work area include a white noise generator 1E to reduce perceived distraction by increasing the ambient noise level as illustrated in FIG. 1E. A wall-mounted speaker 1F with controls 2F is illustrated in FIG. 1F. The horizontally and vertically selectable mounting arrangement of the modular appliance units permits optimal positioning of the speakers 1F in the workspace.

Figure 1H:
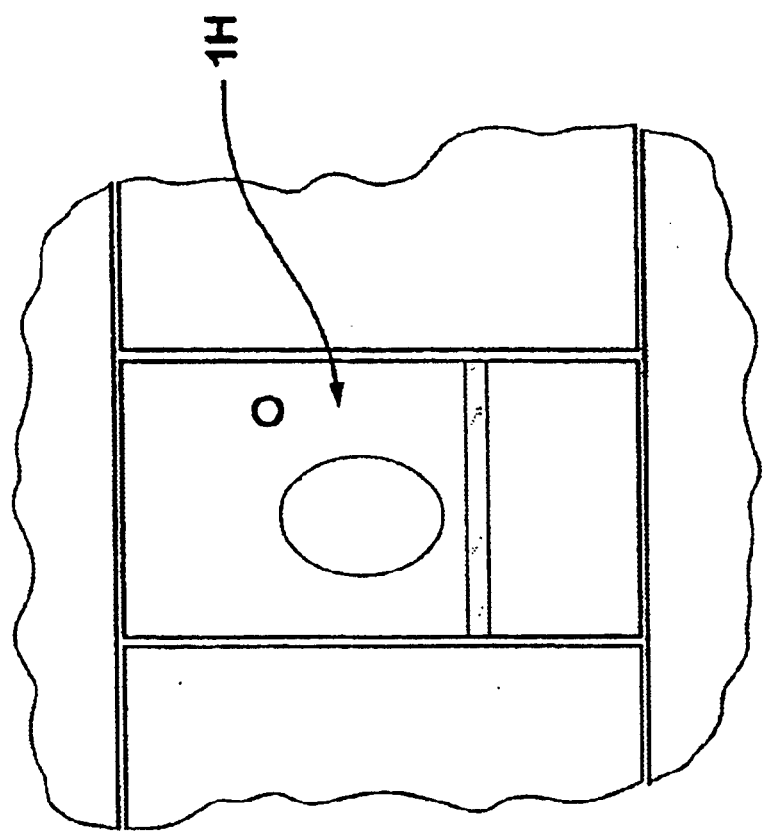
Figure 1G:
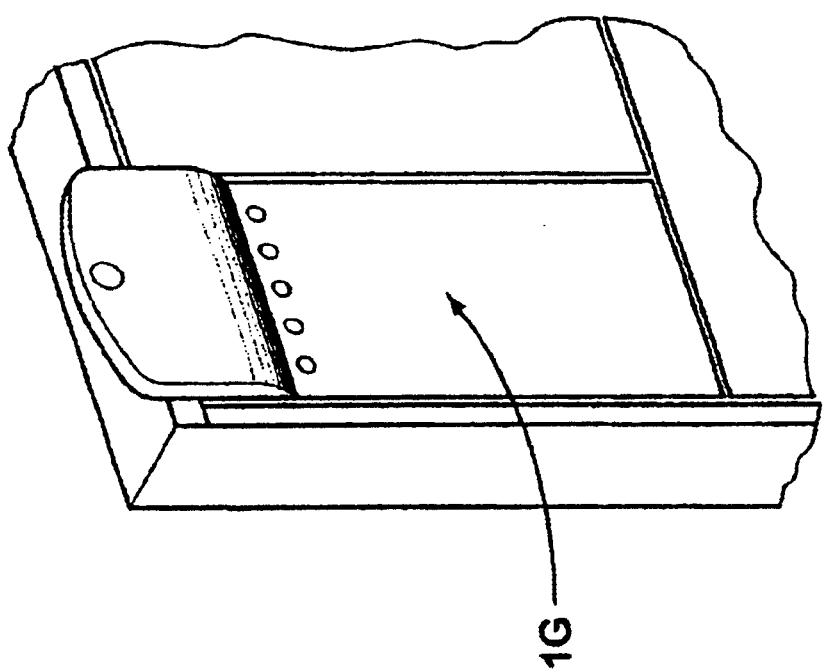
Figure 1J:
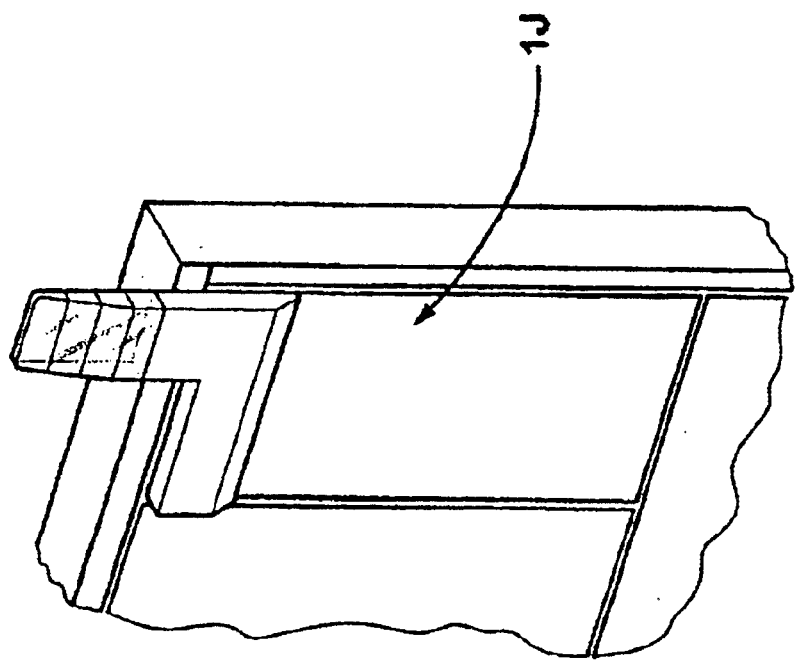
Figure 1I:
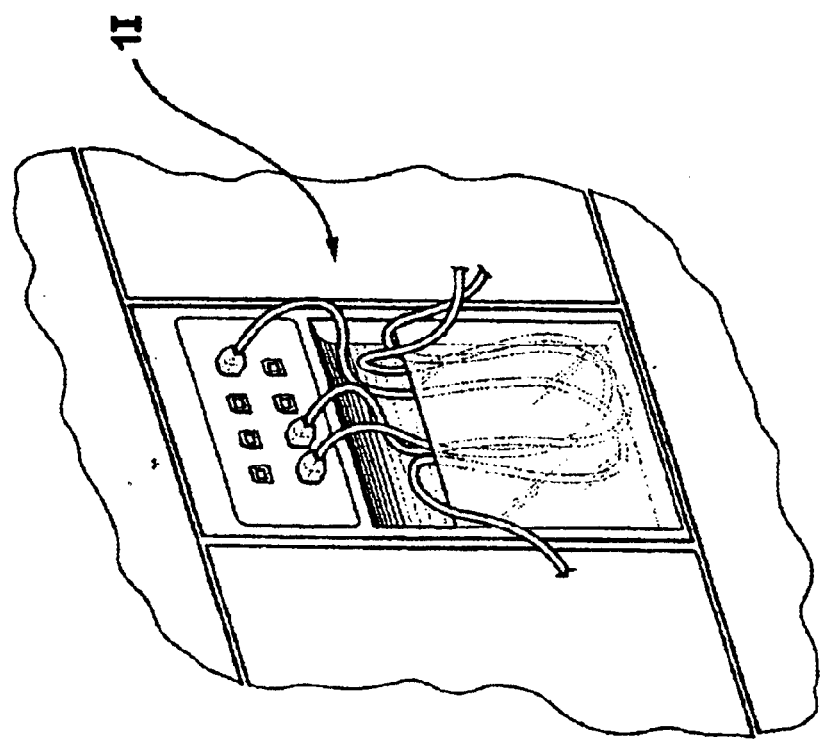
Figure 1L:
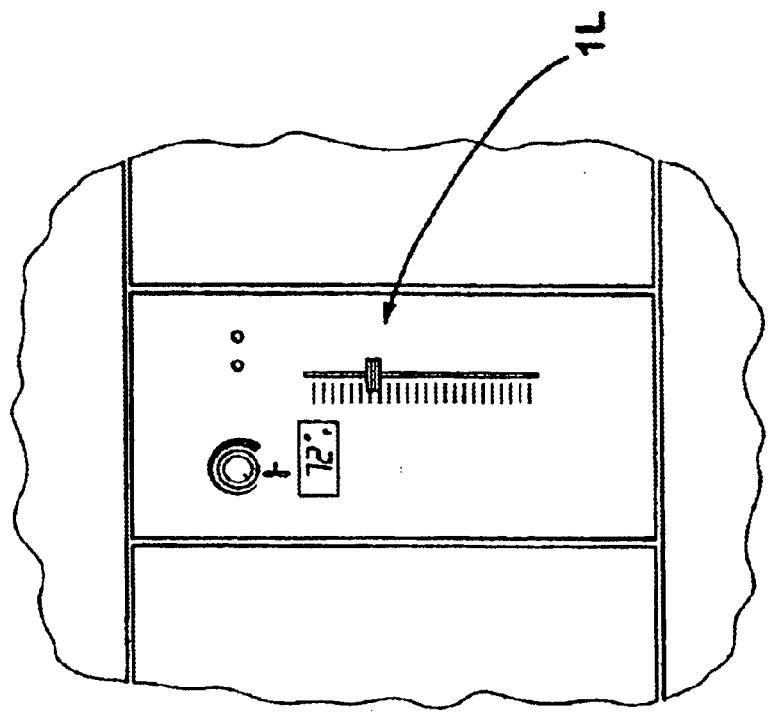
Figure 1K:
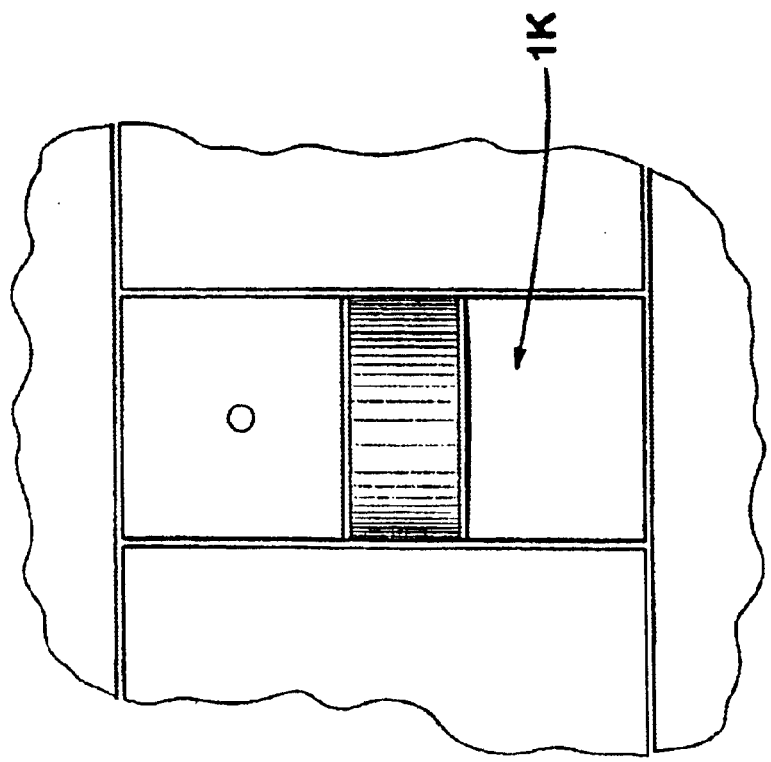
Figure 1N:
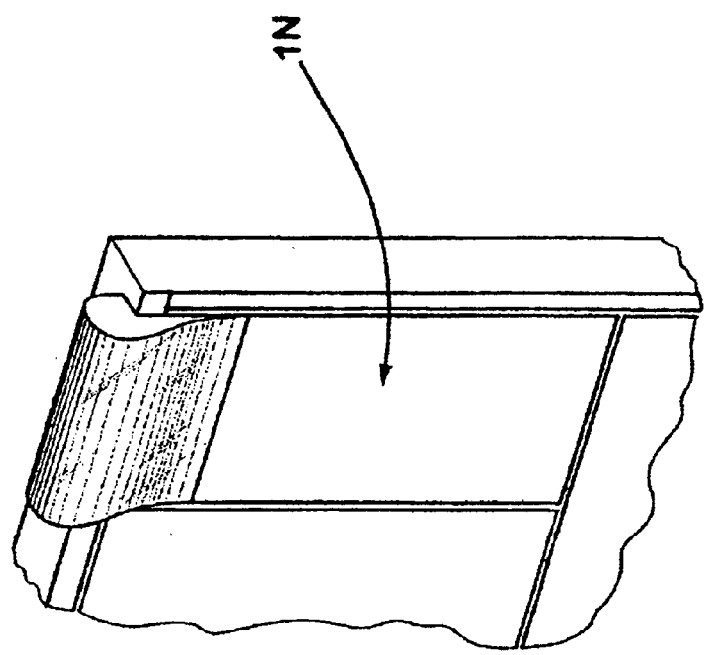
Figure 1M:
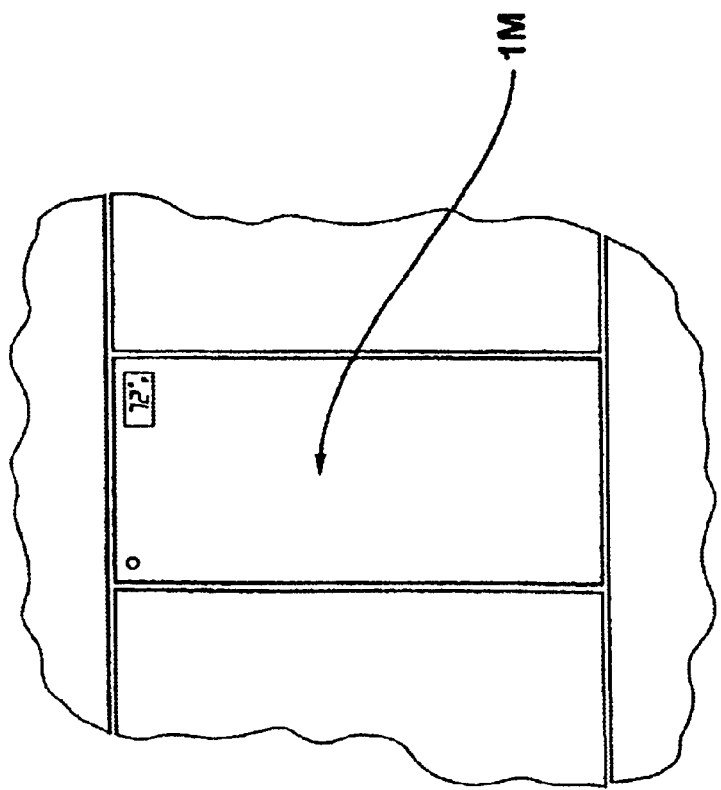
Figure 1P:
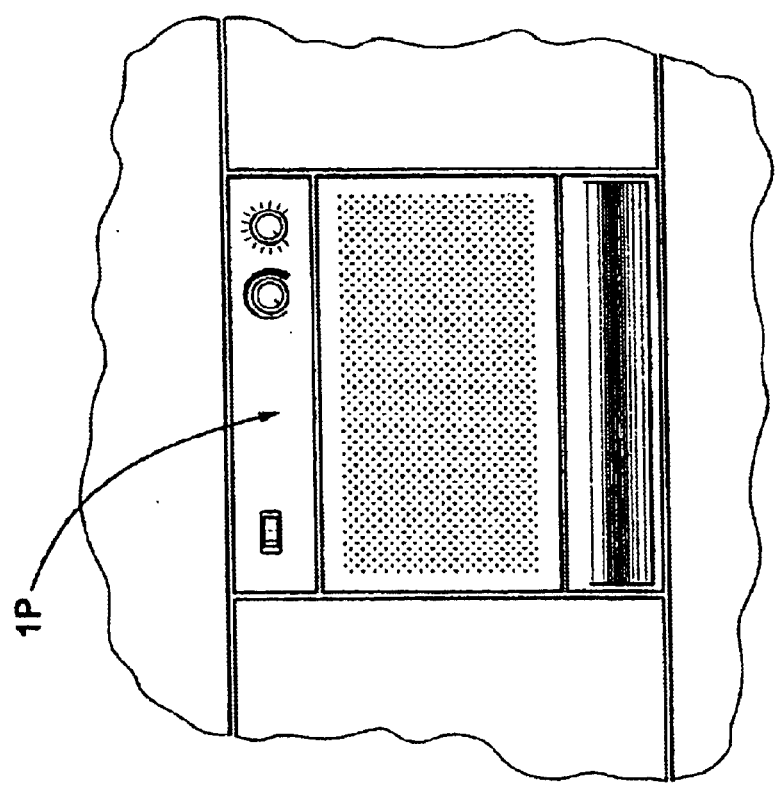
Figure 1O:
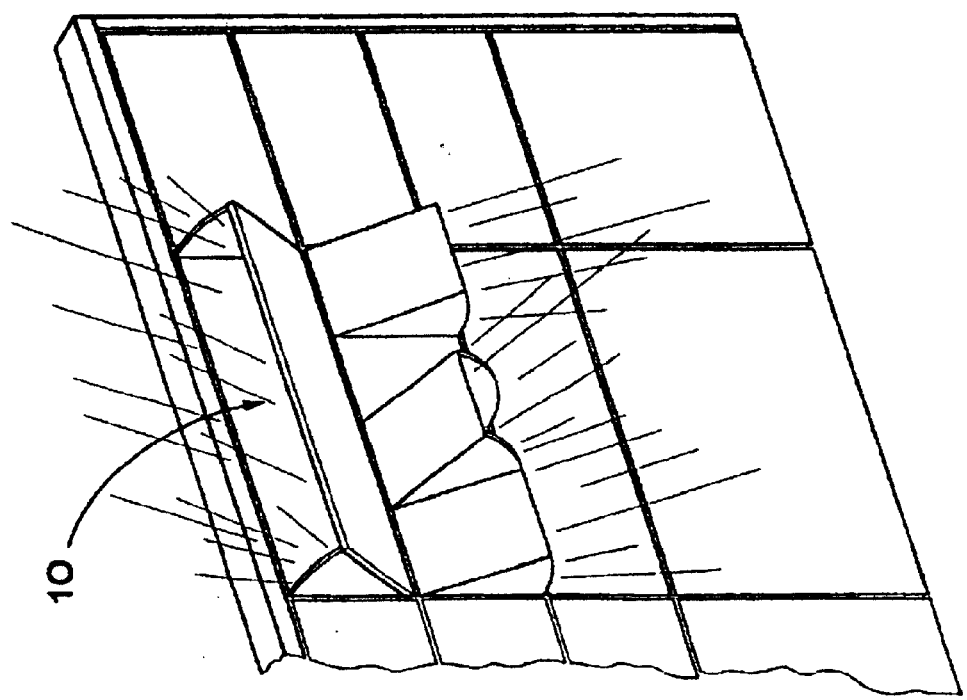
Figure 1R:
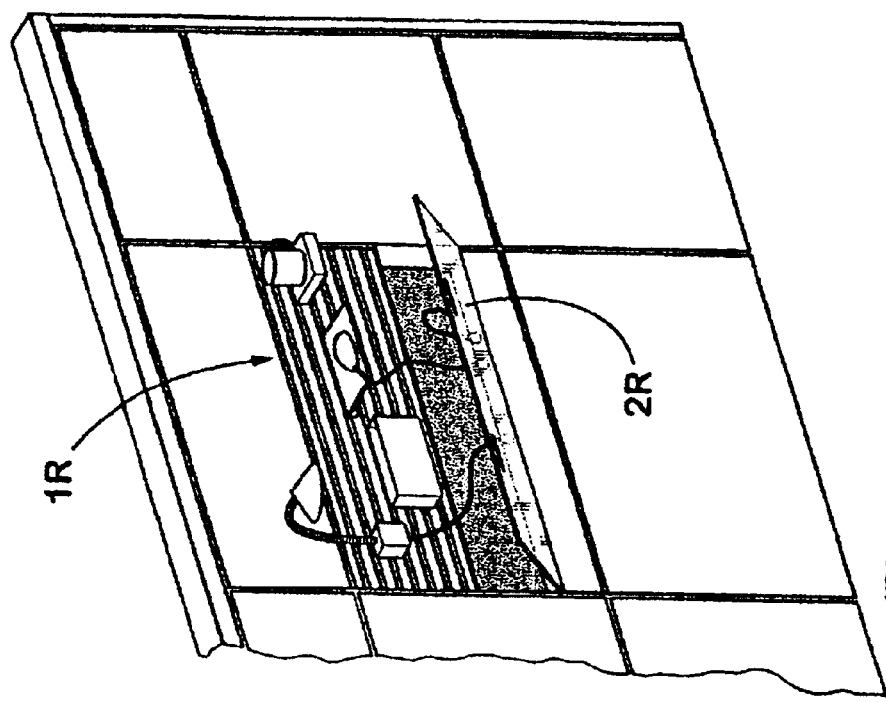
Figure 1Q:
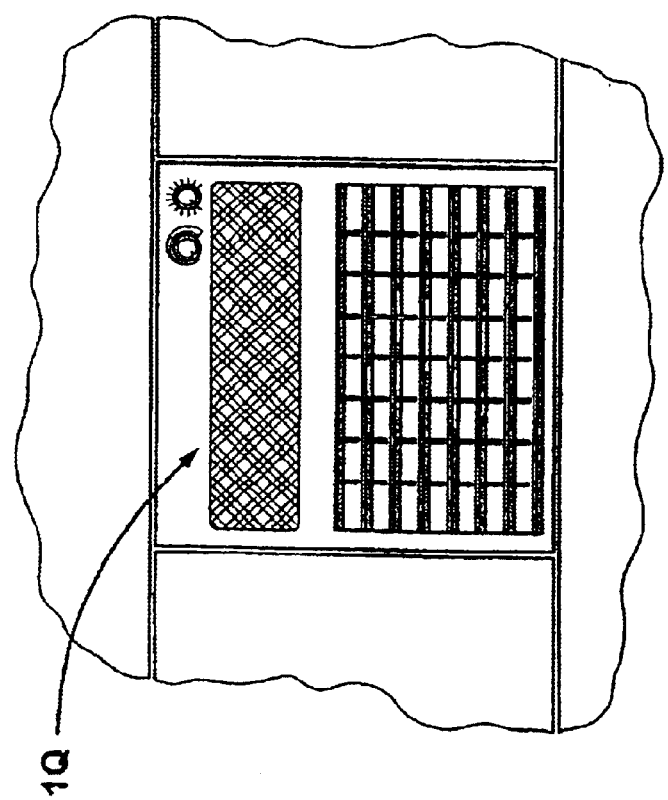

Various network hubs may be utilized to provide a common connection point for the devices on the network. The hubs provide information sharing a distributed feedback. These appliance units can be selectively mounted at an optimum vertical and horizontal position without cluttering the workspace. A modular accessory unit comprising an integrated OEM Bluetooth, 802.11, or other wireless networking hub 1G is illustrated in FIG. 1G. The distribution of this hub is based on coverage area and the number of devices in use. The bluetooth unit may be mounted adjacent the upper edge of the partition to properly position the antenna. An infrared network hub is illustrated in FIG. 1H. The IR hub may be mounted at a central height to provide line-of-sight access to peripherals. A USB hub 1I with integrated cable management is illustrated in FIG. 1I. A status indicator 1J for phone, privacy, voicemail, etc. is illustrated in FIG. 1J. The status indicator is positioned at the upper edge of the partition panel, and a light or the like indicates a phone-in-use condition to others in the area. FIG. 1K shows a passive-infrared motion detector that may be operatively connected to an alarm system, lighting control, and occupant status and location information. A thermometer and thermostat for controlling local heaters and fans to provide an optimal work environment is illustrated in FIG. 1L. A modular accessory unit comprising a distributed temperature sensor with display is illustrated in FIG. 1M. The distributed temperature sensor provides for control of the HVAC system within the office area. An infrared control/light switch for overhead lighting is illustrated in FIG. 1N. The lighting system used with the IR control is outfitted with an IR receiver, and implicit zonal control of the overhead lighting system can be achieved by modifying the shape of the IR beam. Still further, a tip-out lighting fixture to provide both task and ambient light is illustrated in FIG. 1O. The tip-out lighting fixture may be a low-voltage halogen unit providing optimum lighting conditions on the worksurface without cluttering the worksurface. With reference to FIG. 1P, a small space-heater 1P with an integrated thermometer may be utilized to provide consistent temperature control within the work area. Louvers for directing the flow, a control for the speed, and optional remote temperature sensor and/or control is also illustrated in FIG. 1P. The space-heater may be a two way heater providing heat to both sides of the partition. The modular mounting feature permits positioning of the heater at an optimal location, such as directly below the worksurface or adjacent the lower edge of the partition. A fan to provide airflow directed at the occupant and louvers to control direction/flow rate is illustrated in FIG. 1Q. The fan is preferably capable of providing slow airflow, and may be mounted above the worksurface.

Figure 1T:
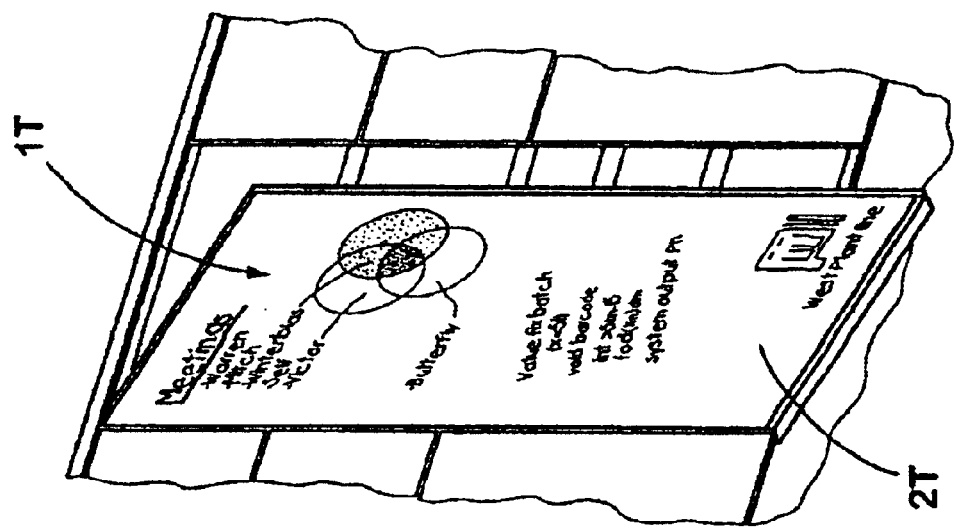
Figure 1S:
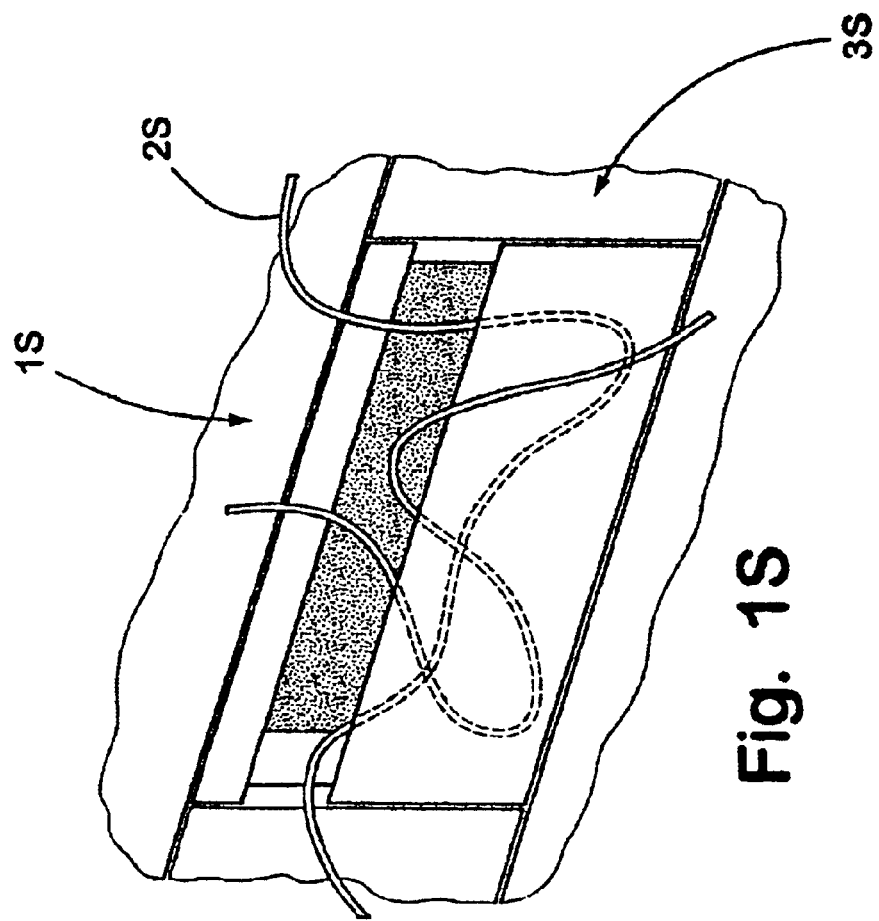
Figure 1V:
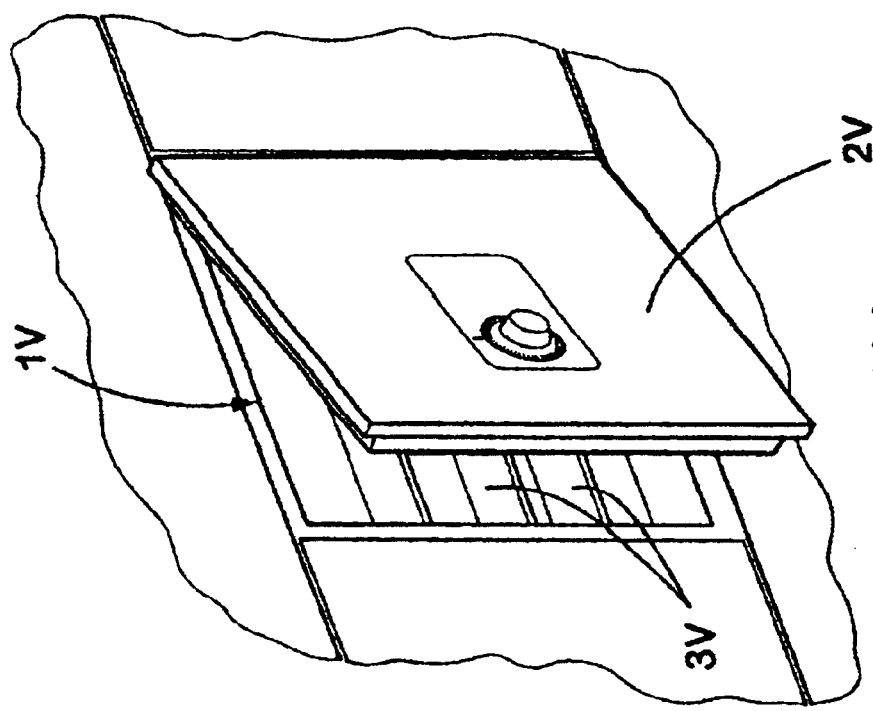
Figure 1U:
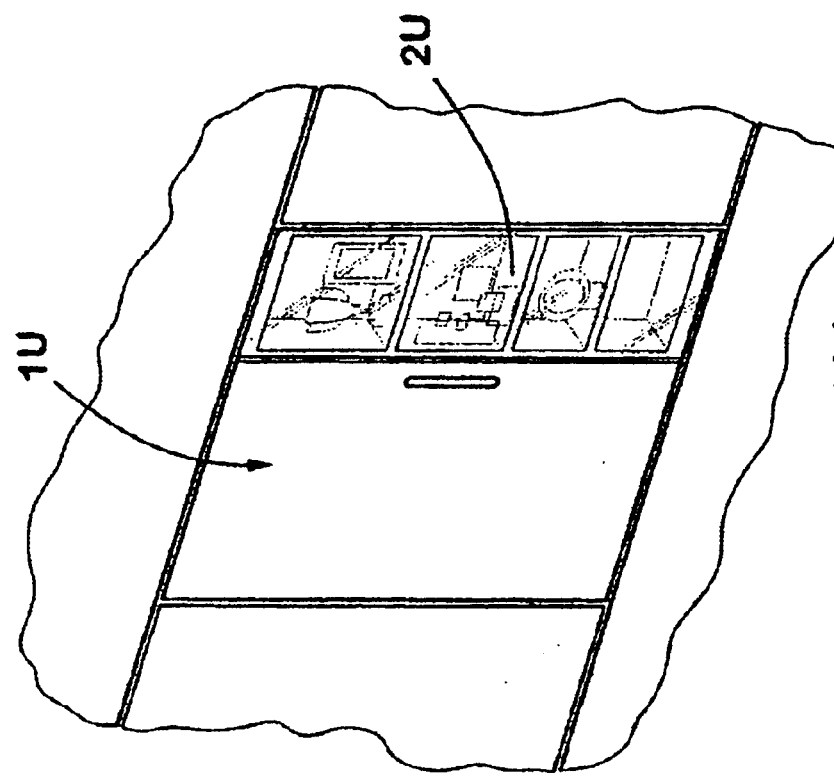
Figure 1X:
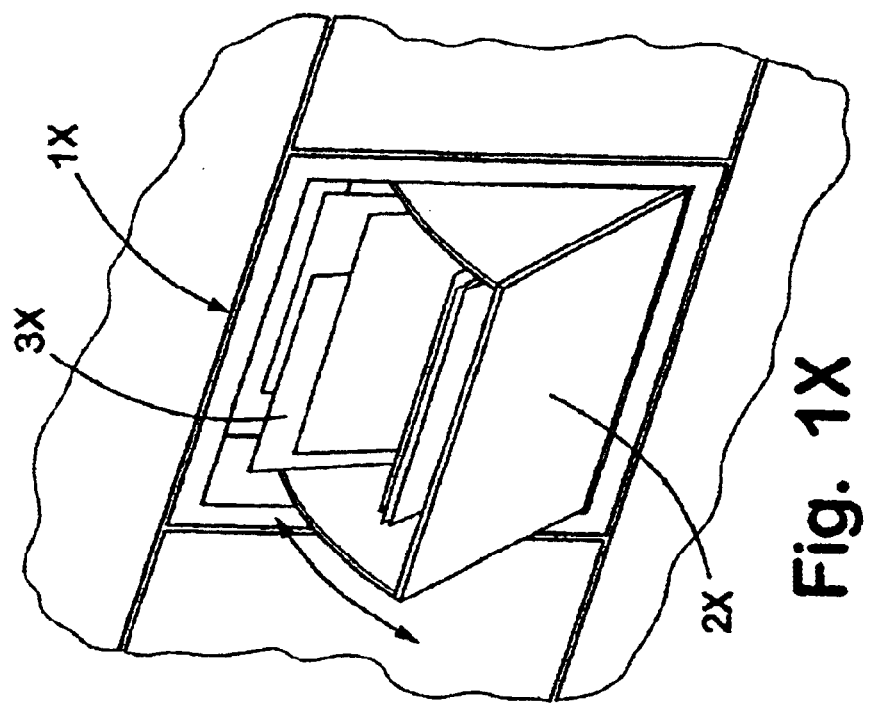
Figure 1W:
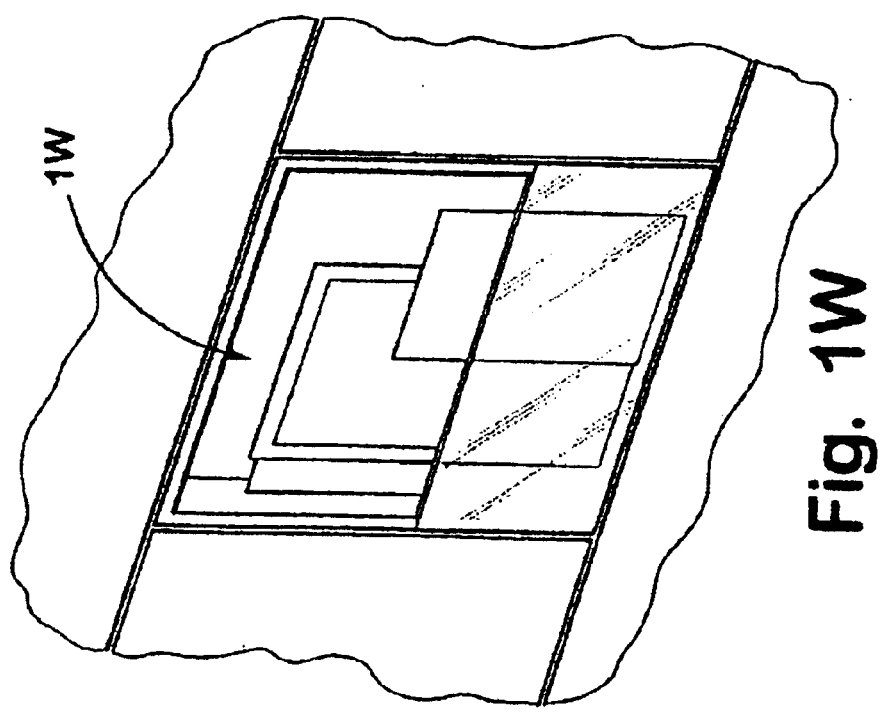

Other modular accessory units according to the present invention facilitate routing, access, and management of utility lines in the work area. A slatwall support surface 1R with translucent tilt-away section 2R for access to power and/or data receptacles positioned within the partition panel is illustrated in FIG. 1R. The slatwall facilitates utilization of space behind the surface. A cable trough IS for management of peripheral cables 2S and the like within the beltway 3S is illustrated in FIG. 1S, and a storage cabinet IT with a pivotably mounted whiteboard door surface 2T is illustrated in FIG. 1T. The storage cabinet provides convenient, private storage of personal items such as medicines, keys, and the like, as well as office items. With reference to FIG. 1V, the modular accessory unit may comprise a storage unit 1U with a clear panel 2U for display purposes. Various personal or decorative items may be placed in the storage unit for display to personalize the work area. A secure storage cabinet 1V with lockable door 2V and adjustable shelves 3V is illustrated in FIG. 1V. A modular accessory unit comprising a receptacle 1W for papers, magazines, and the like is illustrated in FIG. 1W, and a "mail-slot" modular accessory unit 1X is illustrated in FIG. 1X. A retaining member 2X is pivotably mounted at the lower portion thereof to permit pass-through of papers 3X or the like between co-workers or from a public to a private space.

Figure 1Z:
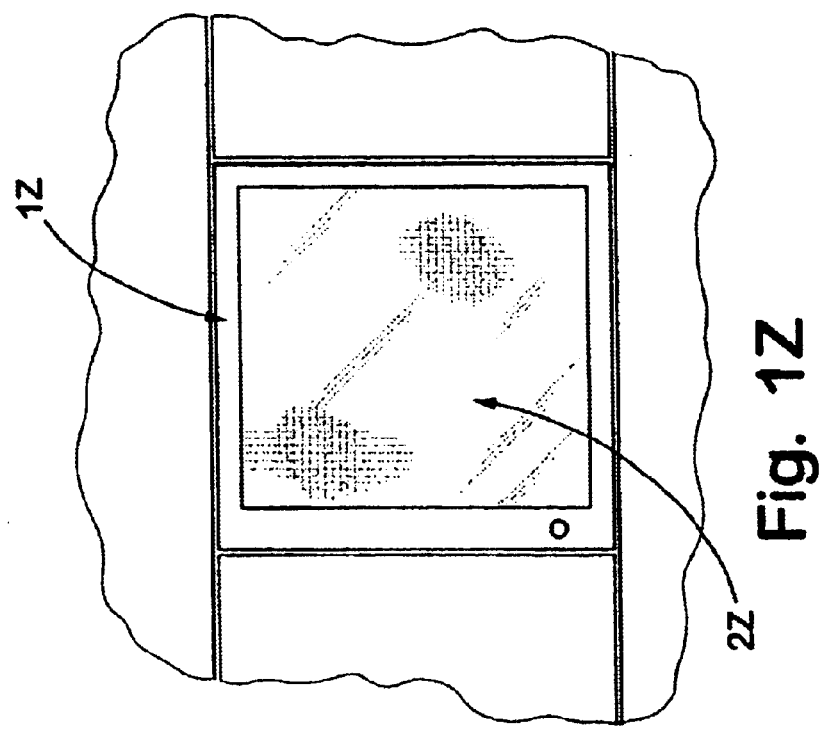
Figure 1Y:
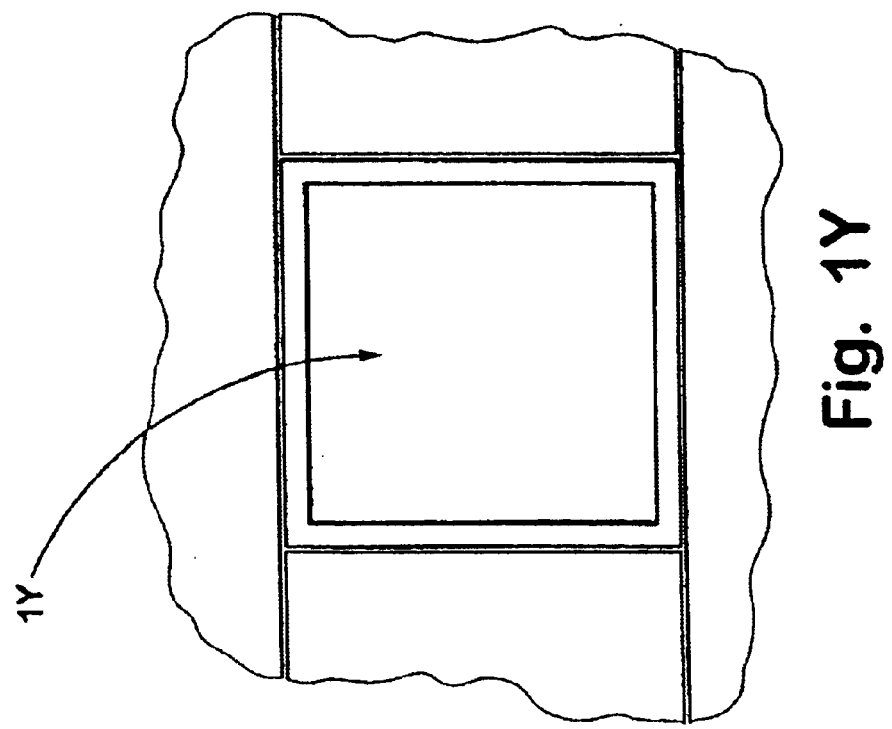
Figure 1A:
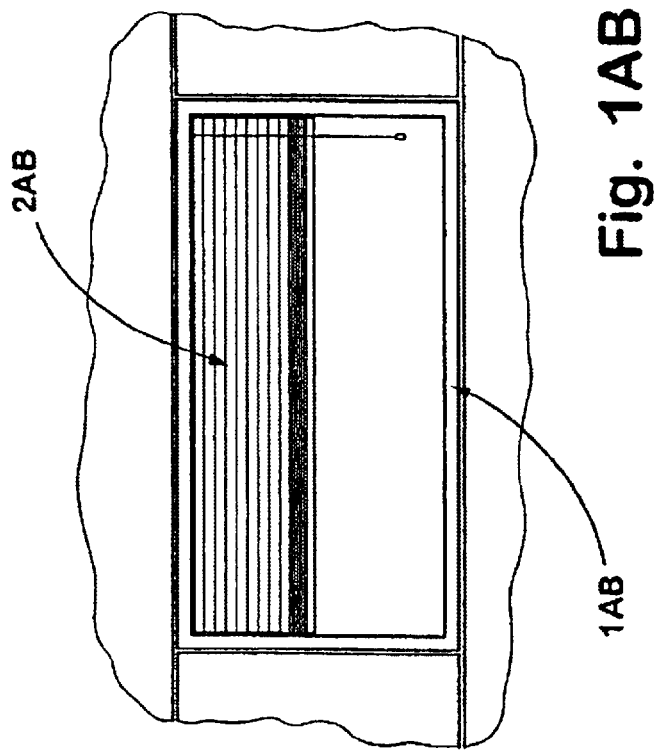
Figure 1A:
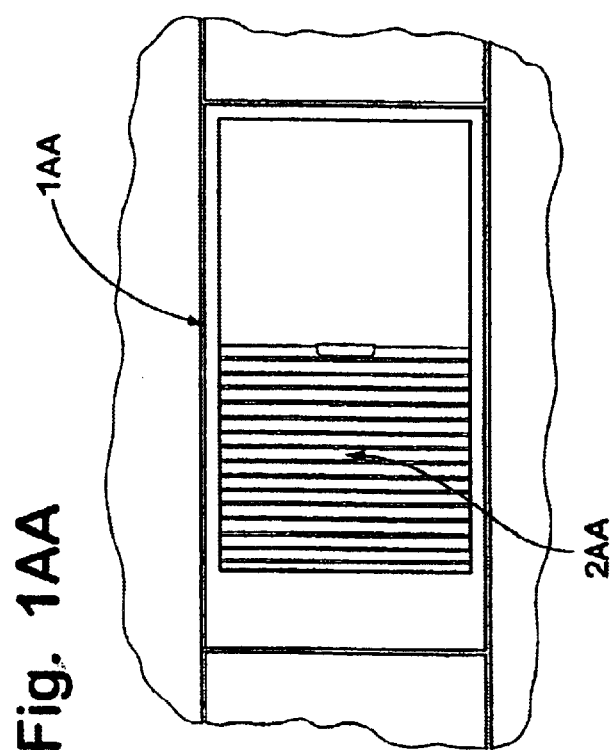
Figure 1A:
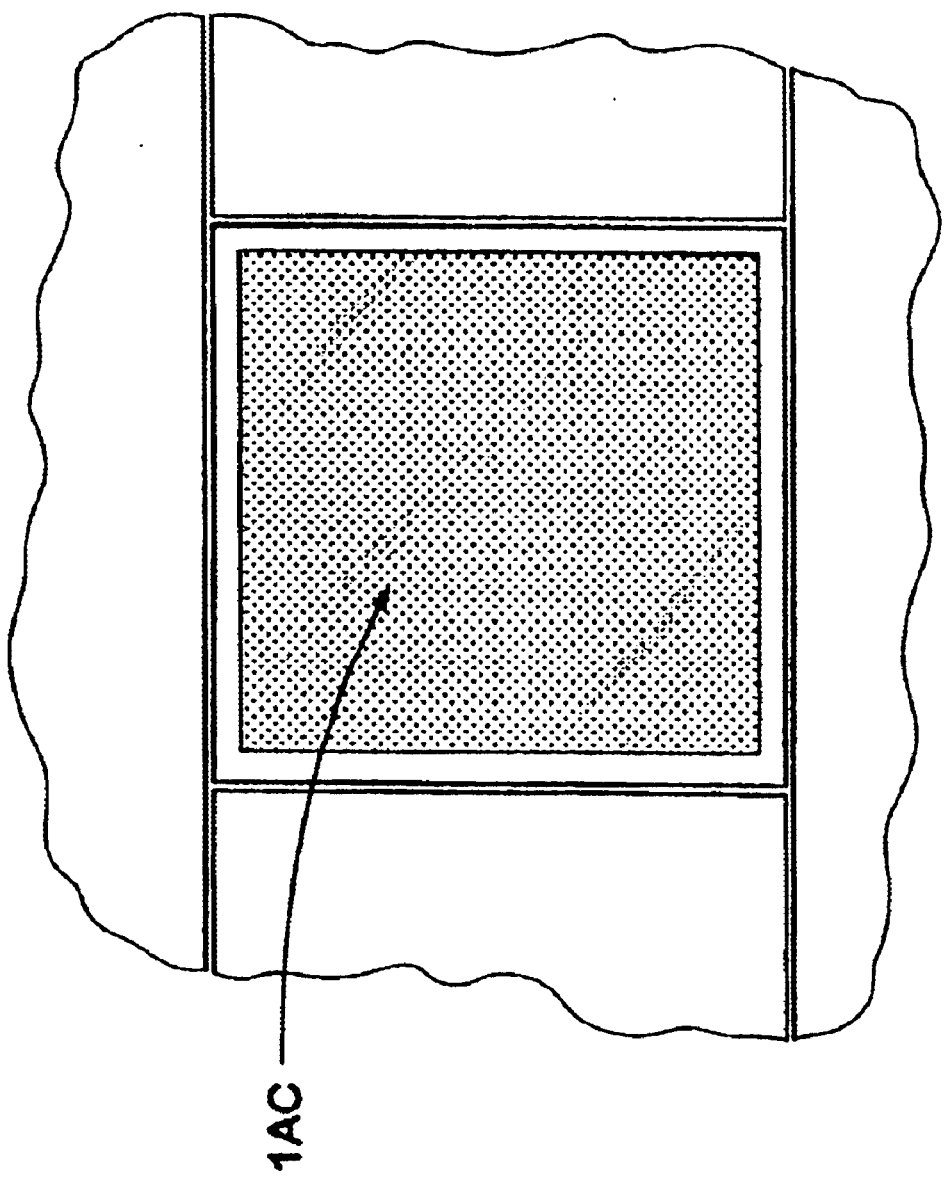
Figure 1A:
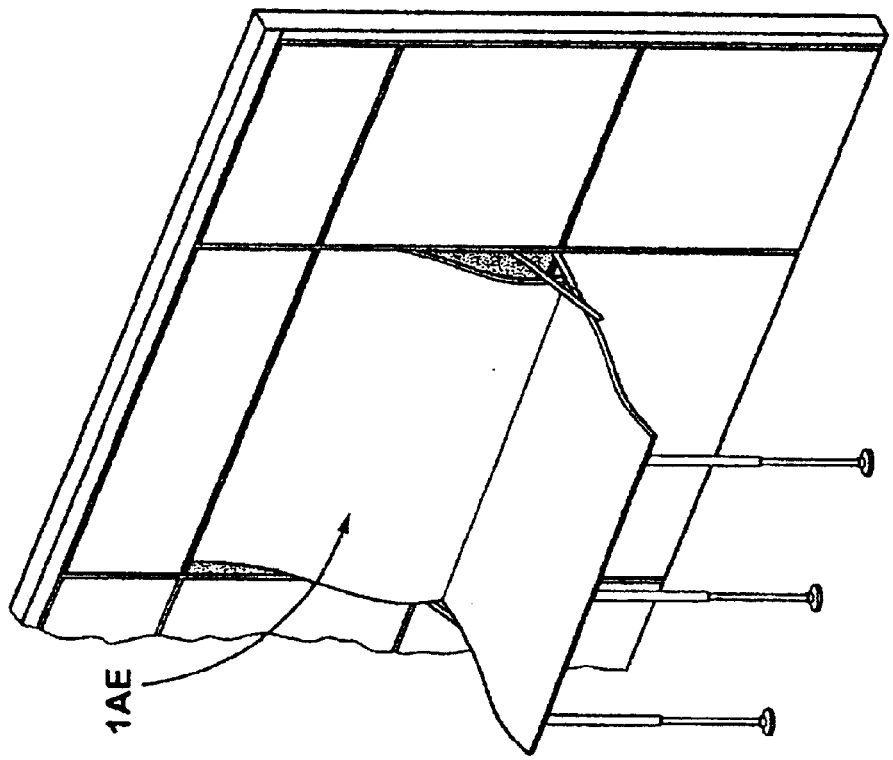
Figure 1A:
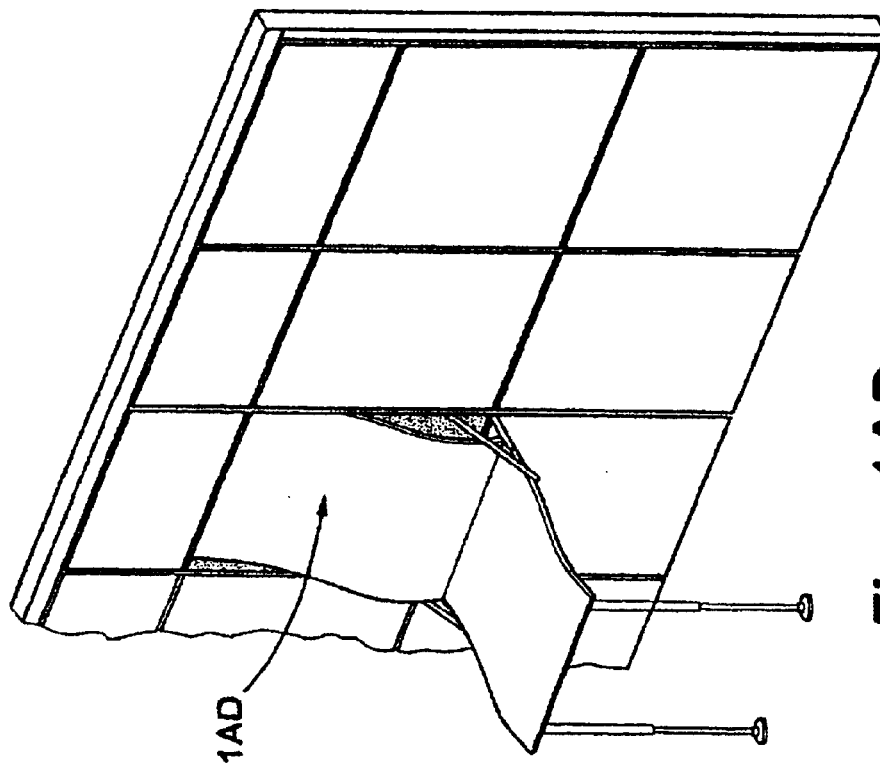

Various other types of modular appliance units may also be utilized to control, monitor and/or restrict access and/or privacy between adjacent workspaces as required for a particular application or office environment. For example, a small window providing visual and aural access through the panel is illustrated in FIG. 1Y. With reference to FIG. 1Z, a small window 1Z provides controlled visual access through the panel by using an LCD glass panel 2Z that can be made clear rather than translucent. With further reference to FIG. 1AA, a window 1AA provides visual and aural access through the panel with access being controlled by a tambour door 2AA. With reference to FIG. 1AB, a small window 1AB provides visual and aural access through the panel with access being controlled with a mini-blind shade 2AB. A window 1AC with a dot-pattern screen to provide limited visibility through the panel is illustrated in FIG. 1AC. Rather than replacing a full-size window, these windows allow for discreet communication between adjacent workspaces.

In addition to the access and/or privacy control arrangements described above, the modular accessory units may also comprise various seating units or the like that may be utilized to provide seating space for users when required, yet be storable in the partition when not required to conserve space. With reference to FIG. 1AD, a fold-out seat 1AD may be utilized to accommodate temporary visitors. The fold-out seat allows for group interactions without having to find an extra chair when working individually. A fold-out seat to accommodate group seating for temporary visitors is illustrated in FIG. 1AE. Such accessory units facilitate movement of objects and workflow off the desktop or worksurface and into the partition panel. Thus, a wide range of modular accessory units may be provided as required by a particular user.

With further reference to FIG. 2A, each partition frame 3 includes a pair of vertical side frame members 12, and upper and lower horizontal frame members 13, 14, respectively that extend between and rigidly interconnect the vertical side frame members 12 to form a generally quadrilateral perimeter. As described in detail in the above-referenced co-pending application Ser. No. 10/077,553, entitled PANEL SYSTEM, vertical side frame members 12 include a plurality of openings 15–18 for mounting cover panels 6, and horizontal frame members 13 and 14 include a plurality of openings 19 and 20. The openings 15–20 receive clips (not shown) on the cover panels 6 to thereby retain the cover panel 6 on the partition frame 3. The vertical side frame members 12 include a plurality of openings 21 (FIG. 5) that permit utility lines such as power and/or data lines to be fed horizontally through the vertical frame members 12 between adjacent partition frames 3. Similarly, upper frame member 13 includes openings 22 (FIG. 3), and lower frame member 14 includes openings 23 (FIG. 4) to permit vertical pass-through of power and/or data lines at the upper and lower edges, respectively, of the partition frame 3. A channel 24 (FIG. 5) extends along the upper horizontal frame member 13 to provide for horizontal lay-in of utility lines along the upper edge of the partition frame 3. Similarly, vertical side frame members 12 include vertically extending channels 25 (FIG. 3) to permit vertical routing of utility lines along the side edges of the partition frame 3. Upper horizontal cross member 13 includes a horizontal row of slots 27 (FIG. 2), and lower horizontal cross member 14 includes a row of horizontal slots 28. Vertical frame member 12 includes openings 39 and 40 that align with the horizontal row of slots in the intermediate cross member 26 to provide a continuous horizontal row of slots without "dead zones" at the vertical frame members 12 (see also FIG. 10). Vertical side frame members 12 each include a vertical row of slots 29. The rows of slots 27–29 may be utilized to support hang-on furniture units such as worksurfaces, binder bins, or the like.

Intermediate beams 4 each include a horizontal row of slots 26 for supporting hang-on furniture units. The intermediate beams 4 also include openings 19 and 20 for securing the cover panels 6. As discussed in more detail below, the openings 19 and 20 may also be utilized to secure smaller cover panels 10 to the partition frame 2 horizontally adjacent a modular accessory unit such as the flat screen display 7 illustrated in FIG. 1. With further reference to FIG. 6, each of the horizontal cross members 4, 13 and 14 include sets of openings 31 at regularly spaced intervals. In the illustrated embodiment, each set of openings 31 is repeated every six inches along each of the horizontal frame members 4, 13 and 14. The regularly spaced openings 31 define a plurality of discrete, serially adjacent mounting spaces 32. Openings 31 receive well-nuts or conventional self-tapping screws or the like to secure the modular accessory units to the partition frame 3. The mounting spaces 32 receive the modular appliance units 7, 8 and 9. For example, the power and data module 8 illustrated in FIG. 1 may have a width of twelve inches and take up two of the mounting spaces 32. Alternately, the modular appliance unit may have a width of twenty-four inches, such that the appliance unit takes up four of adjacent mounting spaces 32. Significantly, the modular appliance units can be mounted at a selected horizontal position in one or more of the mounting spaces 32, such that the horizontal position of the appliance unit can be selected to meet the needs of a particular user and/or application. Also, as described in more detail below, a single intermediate beam 4 may be mounted adjacent the frame members 13 or 14, such that a modular appliance unit may be mounted adjacent the upper or lower edge of the frame 3 by securing the appliance unit to the openings 31 in the intermediate beam 4 and frame member 13 or 14.

Figure 10:
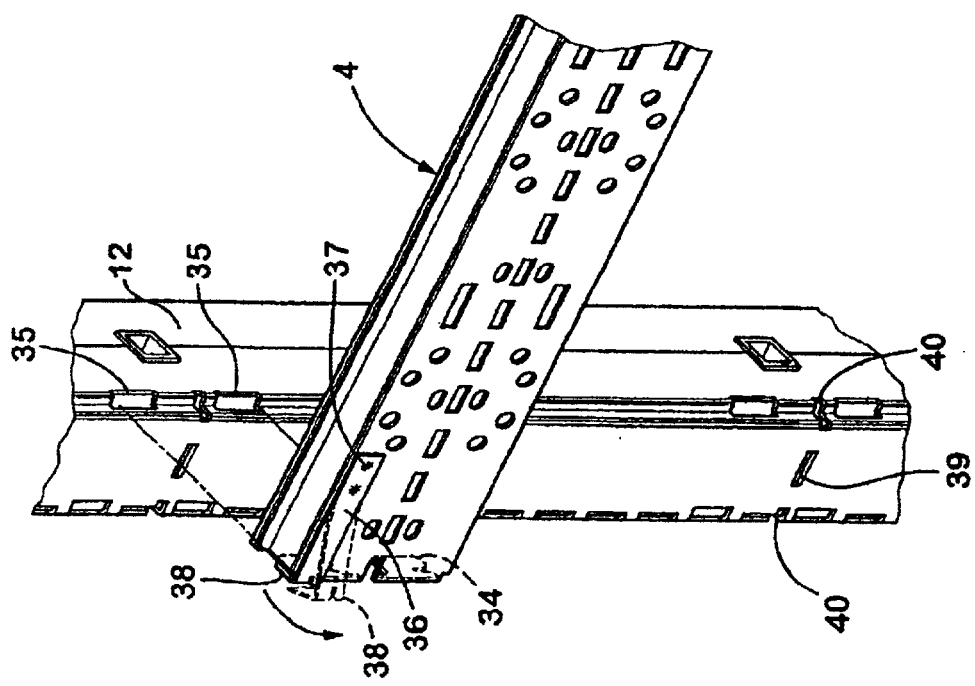
FIG. 10 is an exploded, fragmentary view showing an intermediate beam having a safety clip.

With further reference to FIGS. 7–9, each intermediate beam 4 includes a front face 33 with a horizontal row of slots 26, and openings 19 and 20 that receive clips to mount the cover panels 6 and/or smaller fill-in cover panels 10 and/or 11 illustrated in FIG. 1. As discussed above, each intermediate beam 4 includes a plurality of evenly spaced openings 31 for mounting the modular appliance units, and each intermediate beam 4 also includes a pair of hooks 34 at the opposite ends of the beam. With further reference to FIG. 10, vertical side frame members 12 include openings 35 that receive hooks 34 of the intermediate beams 4 to thereby retain the intermediate beams 4 on the vertical frame member 12. A flexible safety catch 36 is made of spring steel or the like, and is spot welded or otherwise attached to the intermediate beams 4 at the locations marked 37. The safety catch 36 includes a tab 38. During installation, during insertion of hooks 34 in openings 35, tab 38 contacts the vertical frame member 12, and flexes outwardly in the direction of the arrow "A". As the intermediate beam 4 is shifted downwardly to engage the hooks 34, the tab 38 snaps into the opening 35. The tab 38 prevents upward shifting and inadvertent dislodgment of hooks 34 from the openings 35. To remove the intermediate beam 4, the flexible safety catch can be manually flexed, such that the tab 38 is disengaged from the opening 35, thereby permitting disengagement of hooks 34 from openings 35.

Each of the illustrated vertical frame member 12 includes a plurality of openings 35 at equal vertical intervals, such that one or more intermediate beams 4 can be positioned at a selected height on the partition frame 3. In the illustrated example, the vertical spacing between the pairs of openings 35 is 12.360 inches, such that the intermediate beams 4 can be positioned at 12.360 inch intervals on the vertical side frame members 12. Each vertical side frame member 12 includes a set of openings 35 spaced 12.360 inches from the upper horizontal frame member 13, and another set of openings 35 spaced twelve inches away from the lower horizontal cross member 14, such that an intermediate beam 4 can be mounted to the frame 3 12.360 inches away from upper frame member 13 and/or lower frame member 14. Upper frame member 13 and lower frame member 14 also include openings 31 (see also FIG. 2A) for mounting modular appliance units. Each set of four openings 31 in the frame member 13, 14 and intermediate beams 4 are spaced at six inch intervals, such that the appliance units can be positioned on six inch increments at any selected horizontal position. A horizontal row of mounting spaces 32 can be provided along the upper and/or lower portions of the frame 3 if required for a particular application. Thus, the horizontal location of the modular appliance unit can be varied by positioning the appliance unit in a selected space 32. Also, the intermediate beams 4 can be vertically positioned at a selected height, such that the modular appliance units can be readily mounted at selected vertical and horizontal positions.

FIG. 9B schematically illustrates the grid of appliance mounting spaces and cover panel configurations provided by the vertically adjustable intermediate beams and horizontally spaced mounting openings 31 in the intermediate beams and upper and lower frame members 13, 14. In FIG. 9B, each set of mounting openings 35 in the vertical frame members 12 are designated 35A, and each set of mounting openings 31 in the intermediate beams and frame members 13 and 14 are designated 31A. In the example of FIG. 9B, the intermediate beams are designated 4A, 4B and 4C. As discussed above, the sets of openings 31A are spaced at six inch horizontal intervals, designated S1, and the sets of openings 35A are spaced at 12.360 vertical increments, designated S2. The intermediate beams can be attached to selected ones of the sets of openings 35A, thereby providing a plurality of attachment locations 125 that may be utilized by connecting an intermediate beam to a selected set of openings 35A in the vertical frame members 12. The attachment locations 125 form a grid defining a plurality of mounting spaces 32A. Each of the mounting spaces 32A in the illustrated example has a width of six inches, and a height of 12.360 inches. As discussed above, the modular accessory units may have a width of six inches, twelve inches, eighteen inches, twenty-four inches, or any other multiple of six inches. In the example of FIG. 9B, a full width cover panel 6A has a height of S2, and extends across the entire width of the frame 3. A mounting space 32B having a width of twelve inches is provided between shorter width cover panels 11 and 10A immediately below the full width cover panel 6A. A second mounting space 32C having a twenty-four inch width is provided between cover panels 10B and 11. A full width cover panel 6B closes off the lower portion of the frame 3, and has a height of two times S2. The partial width cover panels 11, 10A and 10B may have a width of six inches, twelve inches, or any multiple of six inches to close off the gap or gaps along the side or sides of an appliance unit that is mounted in a mounting space 32. Thus, prefabricated partial width cover panels of six inches wide, twelve inches wide, eighteen inches wide, and each additional multiple of six inches can be provided, each having a height S2. Similarly, prefabricated full width cover panels 6 having heights S2, and each multiple of S2 may also be provided. Thus, the modular appliance units for a particular workspace or other such application can be selected to suit a user's needs. The horizontal and vertical location of the modular appliance units can also be selected, and the required number of intermediate beams are installed to the frame 3 at the desired vertical location(s). The required number and sizes of cover panels can then be selected and installed to close off the spaces that are not occupied by a modular appliance unit.

Figure 11:
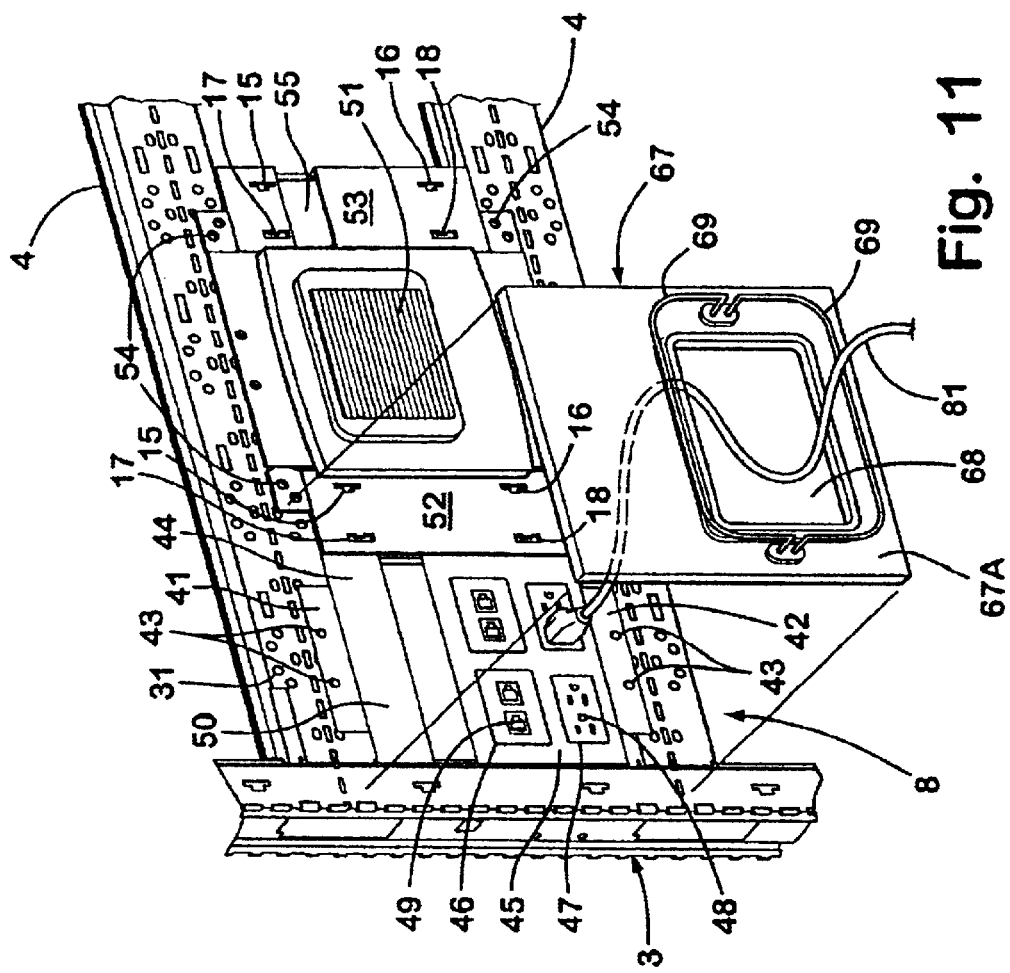
FIG. 11 is a fragmentary view of a partition frame with two modular appliance units mounted thereto.

With reference to FIG. 11, power and/or data module 8 includes an upper flange 41, and a lower flange 42, each of which has at least two clearance openings 43. The openings 31 in intermediate beams 4 receive conventional well-nuts (not shown), and conventional threaded fasteners such as bolts or the like (also not shown) that extend through the clearance openings 43 in flanges 41 and 42 to thereby secure the power and/or appliance module in the mounting space 32. Alternately, self-tapping screws or other conventional fasteners may be received in openings 31 to secure the modular appliance units to the partition frame. Housing 44 of module 8 includes a front face 45 having openings 46 and 47 for mounting power receptacles 48 and data receptacles, respectively. A large opening 50 through the front face 45 permits pass-through of power and/or data lines from the interior space of the partition frame to the exterior. A bezel 67 may be releasably secured to the housing 44 and/or partition frame 3 to cover the housing 44 and close off opening 50. Bezel 67 includes an opening 68 to provide user access to power receptacles 48 and data receptacles 49. A pair of wire managers 69 extend around opening 68. Wire managers 69 are horizontally spaced from the front face 67A of bezel 67 such that utility lines such as power line 81 can be routed between a wire manager 69 and the face 67A of bezel 67.

The modular appliance unit may also comprise a display screen 51 (FIG. 11) that is connected to a programmable computer (not shown). Display screen 51 may be a touch tone screen permitting users to, for example, reserve a conference room for a meeting or the like.

A left hand cover panel bracket 52 and a right hand cover panel bracket 53 are mounted on the intermediate horizontal beams 4, and extend between the intermediate beams 4 to provide a mounting location for the smaller fill-in cover panels 10 and/or 11. Brackets 52 and 53 each include a plurality of openings 54 that receive conventional threaded fasteners (not shown) that are threadably received in the conventional well nuts (not shown) that are positioned in the openings 31 of the intermediate beams 4. The illustrated brackets 52 and 53 each include cover panel mounting openings 15, 16, 17 and 18 having the same configuration as openings 15, 16, 17 and 18 in frame members 12, such that cover panels 10 can be mounted to the cover panel brackets 52 and 53. This arrangement permits the cover panels 10 to have the same mounting clip and construction as the full width segmented cover panels 6. Furthermore, the cover panel mounting brackets 52 and 53 ensure that the vertical side edges of the cover panels 10 directly adjacent the modular appliance remains securely mounted to the frame 3, and does not bow outwardly or otherwise create an unsightly appearance. The left hand and right hand cover panel brackets 52 and 53 may optionally include a cutout 55 that permits wiring to be passed from within the panel outwardly between the cover panels 10 and the vertical side member 56 of the cover panel bracket 52 and/or 53.

With further reference to FIG. 12, the modular appliance unit may also comprise a storage unit 9. In the illustrated example, the storage unit 9 has a width of about twenty-four inches, and includes "shoebox" shaped housing 58 with flange 57 extending upwardly from housing 58, and a lower flange 59 extending downwardly from housing 58. Each of the flanges 57, 59 includes a plurality of fastener openings 61 that receive a conventional threaded fastener that is threadably received into a conventional well-nut that is positioned in the openings 31 in the intermediate horizontal beams 4. Alternately, as discussed above, self-tapping screws or the like may be utilized to secure the modular appliance units to the frame. The housing 58 of storage unit 9 includes one or more vertical center walls 62, vertical side walls 63, horizontal lower side wall 63A, upper horizontal side wall 63B, and vertical rear wall 63C. The walls 62 and 63 each include a plurality of horizontally extending flanges 64 forming slots 64A that may be used to support trays 65, paper holder 66, and the like. Paper holder 66 includes a plurality of vertical wires 66A, downwardly angled wires 66B, and horizontal wires 66C that are configured to retain a plurality of papers, files, and the like in a generally upright position. The walls 62, 63 and slots 64A may be configured to slidably support a compact disk ("CD") jewel box 64B. A right hand cover panel bracket 53 and/or left hand panel bracket 52 are mounted directly adjacent the storage unit 9 to provide an attachment location for the cover panels 10. Trays 65 may have generally vertical side walls 65A forming a shallow, upwardly opening cavity 65B. A lid 60 (see also FIG. 12A) may be removably positioned on tray 65 to close off cavity 65B. Lid 60 is flat, and includes an opening 60A through the central portion to provide a finger grip for a user. A small step 65D extends around the upper edge 65E of walls 65A to support and position lid 60 with upper surface 60B thereof generally flush with upper edge 65E. The shelves 65 may have an overall front to rear dimension that is greater than the depth of the housing 58, such that the forward portion 65C of the tray 65 extends outwardly beyond the peripheral edge 58A of the housing 58. As illustrated in FIG. 1, storage unit 9 may optionally include a door 82 that pivots between open and closed positions to selectively close off at least a portion of housing 58.

Storage unit 9 may also include a pencil holder 130, a telephone holder 131, and a hanging file holder 132. Pencil holder 130 includes a flat upper portion 133 with opposite side edges 134 that support pencil holder 130 in slots 64A. Telephone holder 131 includes a housing 135 having at least a pair of opposed edges that engage slots 64A on opposite sides of a vertical center wall 62. Hanging file holder 132 is formed from wire, and includes horizontal hanger portions 137 that support standard hanging file folders 138. Walls 62 may include a plurality of openings 139 therethrough, each of which is positioned adjacent rear wall 63C and slots 64A. During installation, ends 140 of hanging file holder 132 may be flexed inwardly and inserted into openings 139 to thereby support file holder 132. When installed, vertical portions 141 of file holder 132 extend adjacent rear wall 63C, with the lower portion of vertical portions 141 contacting rear wall 63C to prevent rotation about ends 140. Horizontal portions 142 of holder 132 extend outwardly to position file holder 132. Paper holder 66 includes a somewhat similar mounting arrangement, except that a vertical wire 66A contacts the storage unit 9 adjacent the lower edge of housing 58 to prevent rotation of holder 66. As discussed above, the various modular appliance units can be mounted at various horizontal locations along the intermediate beams 4, and cover panels 10 of standard size are then utilized to fill in the gaps defined between the modular appliance unit and the vertical side frame members 12.

With further reference to FIG. 13A, a second embodiment 70 of the power and/or data modular appliance may include a plurality of flanges 57, 59, each having one or more openings 61 that receive conventional threaded fasteners for securing the power and data module 70 to the intermediate beams 4 in substantially the same manner as described above in connection with the storage module 90. Module 70 includes a main housing 71 and a vertically extending inner housing 71A that supports power receptacles 73 facing sidewardly on each side of the housing 71A. A pair of vertical side wall portions 74 may be utilized to mount data outlets 75 facing inwardly along the opposite sides of module 70. The electrical power line 76 connect to the electrical power system 76A (FIG. 1) extending along the base. Similarly, data lines 77 can be connected to the data lines 77A (FIG. 1) extending along the top edge of the panel system. Alternately the power lines 76A and data lines 77A supplying the panel system may be routed internally through the openings 21 (see also FIG. 5) in the vertical side frame members 12. Main housing 71 includes upper and lower horizontal walls 71B, 71C, respectively, and a vertical rear wall 71D. Upper and lower walls 71B and 71C include an elongated opening 72 to permit vertical routing of power lines 76 and/or data lines 77 from within main housing 71 to the interior space of the partition panel. Large openings 71E may also be provided along the sides of main housing 71 to permit horizontal routing of power lines 76 and/or data line 77 from within main A fill-in cover panel 10 or 11 having the same width as the power and data module 70 can be mounted to the intermediate beams 4 and 5 to close off the module 70, such that a pair of side-by-side fill in cover panels 10 and/or 11 close off the interior space between the intermediate beams 4 and 5.

With reference to FIG. 14, skin bracket 53 may optionally include a hook 78 that may inserted into an opening 31. The bracket 53 is then shifted in the direction of the arrow "B" to align the openings 54 in bracket 53 with the openings 31 in the intermediate beam 4 and/or 5. One or more conventional threaded fasteners 79 are then inserted through the openings 54 and 31, and threaded into a conventional well nut 80. Alternately, conventional self-tapping screws (not shown) may be driven into openings 31 to secure the modular appliance units to the partition frame.

Figure 15:
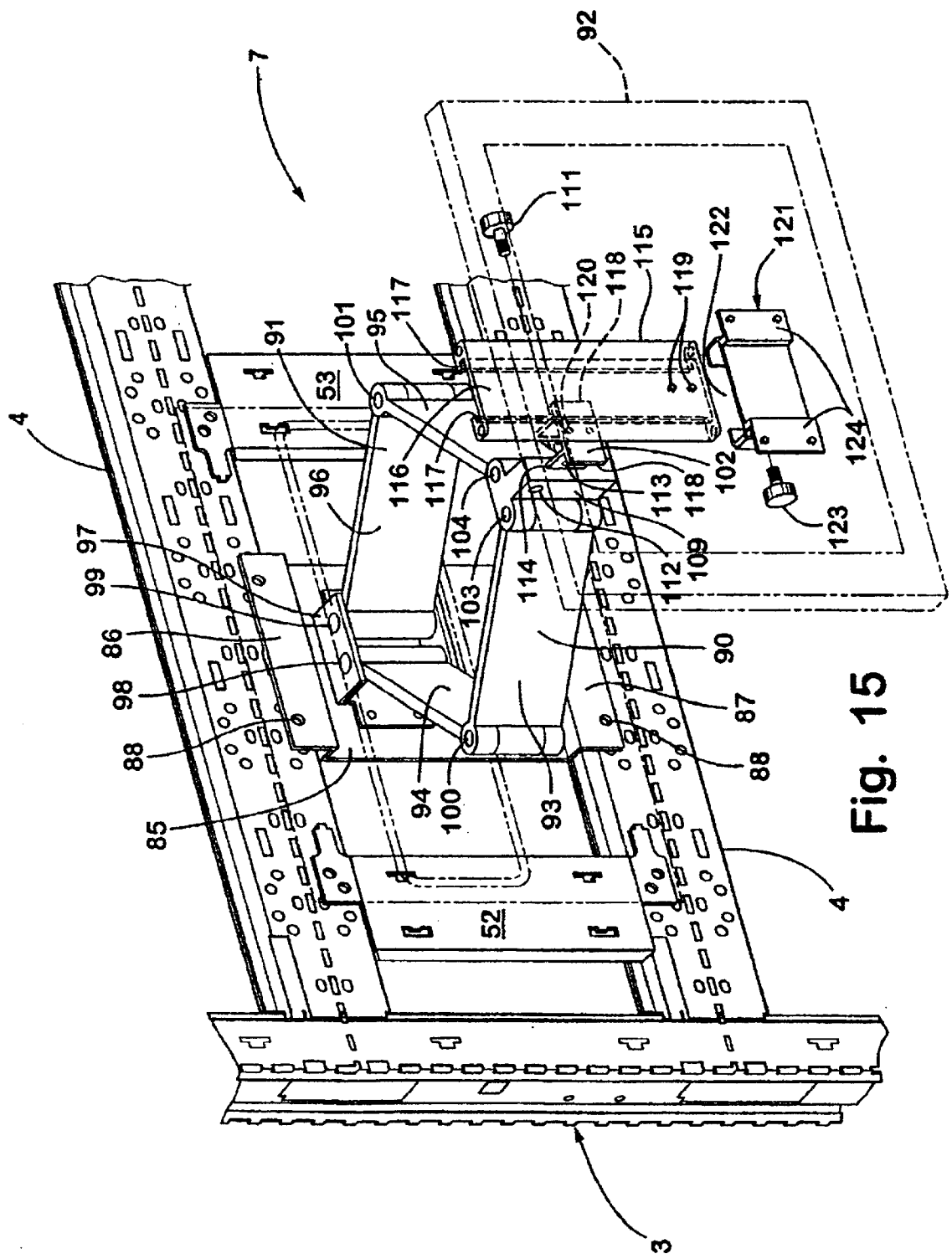
FIG. 15 is a fragmentary, perspective view of a modular appliance unit having a flat screen display and articulating support arm.
Figure 17:
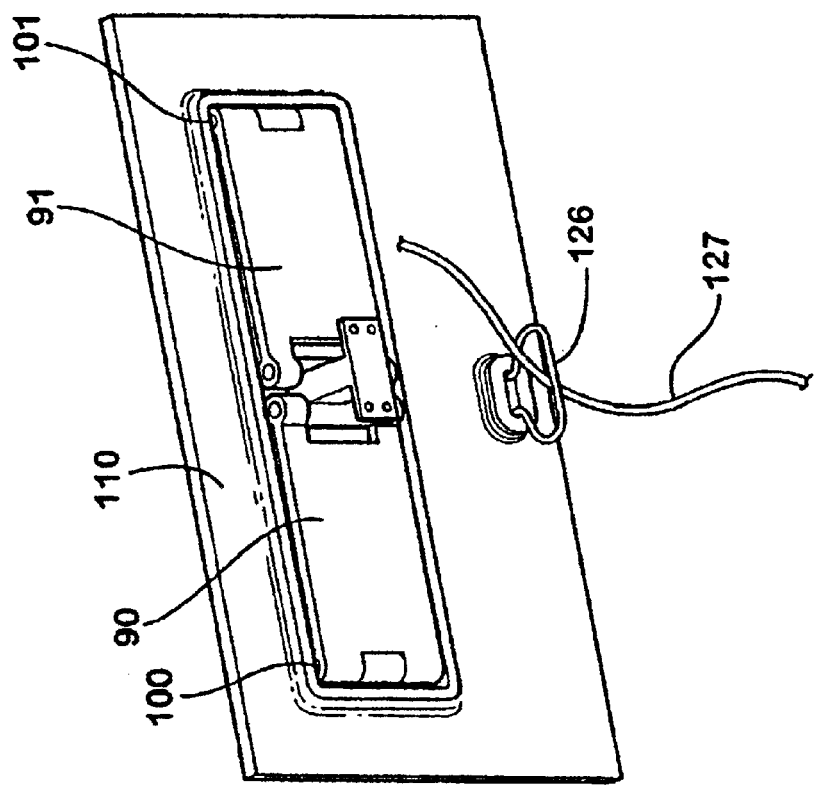
FIG. 17 is a perspective view of the articulating support arm of FIG. 15 in the fully retracted position.
Figure 16:
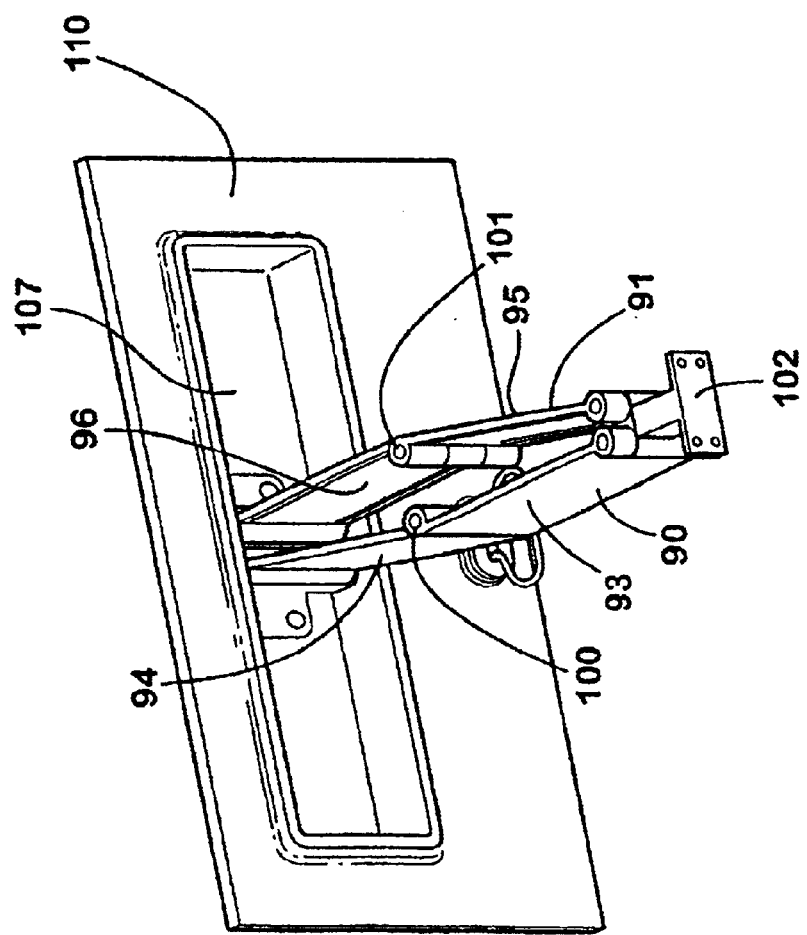
FIG. 16 is a perspective view of the articulating support arm of FIG. 15 in the fully extended position.

With further reference to FIG. 15, a flat screen monitor appliance module 7 includes a housing 85 extending between the intermediate beams 4 and 5. The housing 85 includes upper and lower flanges 86 and 87, each having a plurality of clearance holes 88 that receive threaded fasteners that extend into well nuts positioned in the openings 31 in the intermediate beams 4 and 5. A flat screen monitor 92 is secured to the housing 85 by first and second support arm assemblies 90 and 91. First arm assembly 90 includes a first link 93 and a second link 94. Similarly, the second arm assembly 91 includes a first link 95 and a second link 96. The first links 93 and 95 are pivotally connected to a base bracket 97 by hinges 98 and 99. First link 93 is pivotally connected to second link 94 by a hinge 100. Similarly, first link 95 is pivotally connected to second link 96 by a hinge 101. The outer ends 105 and 106 of second links 94 and 96, respectively are pivotally connected to a bracket 102 by hinges 103 and 104, respectively formed in link member 109. A thumbscrew 111 or the like extends through openings 113 in clevis 114 of bracket 102, and through opening 112 in link member 109 to permit tilt adjustment of screen 92 about a horizontal axis. Thumbscrew 111 may be tightened to secure screen 92 at the desired angle. An elongated slide member 115 includes a channel 116 having opposed grooves 117. When assembled, grooves 117 receive edges 118 of bracket 10, and openings 119 in slide member 115 align with openings 120 in bracket 102. Threaded fasteners or the like extend through openings 119 and 120 to interconnect bracket 102 and slide member 115. A connector bracket 121 forms a channel 122 that slidably receives the slide member 115 to provide height adjustment of screen 92. A thumbscrew 123 or the like secures the screen 92 at the desired height. Bracket 121 includes flanges 124 that include openings 125 for mounting screen 92 on bracket 121. With further reference to FIG. 17, a cable management loop 126 is secured to bezel 110. Power lines 127 or the like may be routed through the loop 126 to ensure that the lines do not interfere with the user's other equipment and/or activities. The first and second arm assemblies 90 and 91 support the flat screen 92 for horizontal movement between the fully extended position illustrated in FIG. 16, and the fully retracted position illustrated in FIG. 17. A recess 107 is formed in the face 108 of a bezel 10 that mounts to the frame 3, and/or brackets 52, 53. When in the fully stored position of FIG. 17, the arm assemblies 90 and 91 are received within the recess 107 to permit the screen 92 to be positioned directly adjacent the partition panel 2 to which it is attached.

The flat screen assembly 7 of FIG. 15 may include a pair of friction rollers 115 made of rubber or other elastomeric material at hinges 98 and 99. With further reference to FIGS. 18–20, links 94 and 96 each include a hexagonal cast boss 151 that is integrally formed with the link. The friction rollers 150 include a hexagonal opening 152 therethrough having slightly smaller overall size than the boss 151, such that the roller 150 is secured to the boss 151 by a tight interference fit when installed. With reference to FIG. 19, the distance "D" between the center of the two rollers 150 is slightly less than the diameter of the rollers 150, such that the rollers 150 are elastically deformed at the contact area 153 between the two rollers 150. This interference fit between the adjacent rollers 150 creates friction to control extension and retraction of the flat screen 92 and prevent excessive inadvertent movement thereof.

Figures 24, 25, 26:
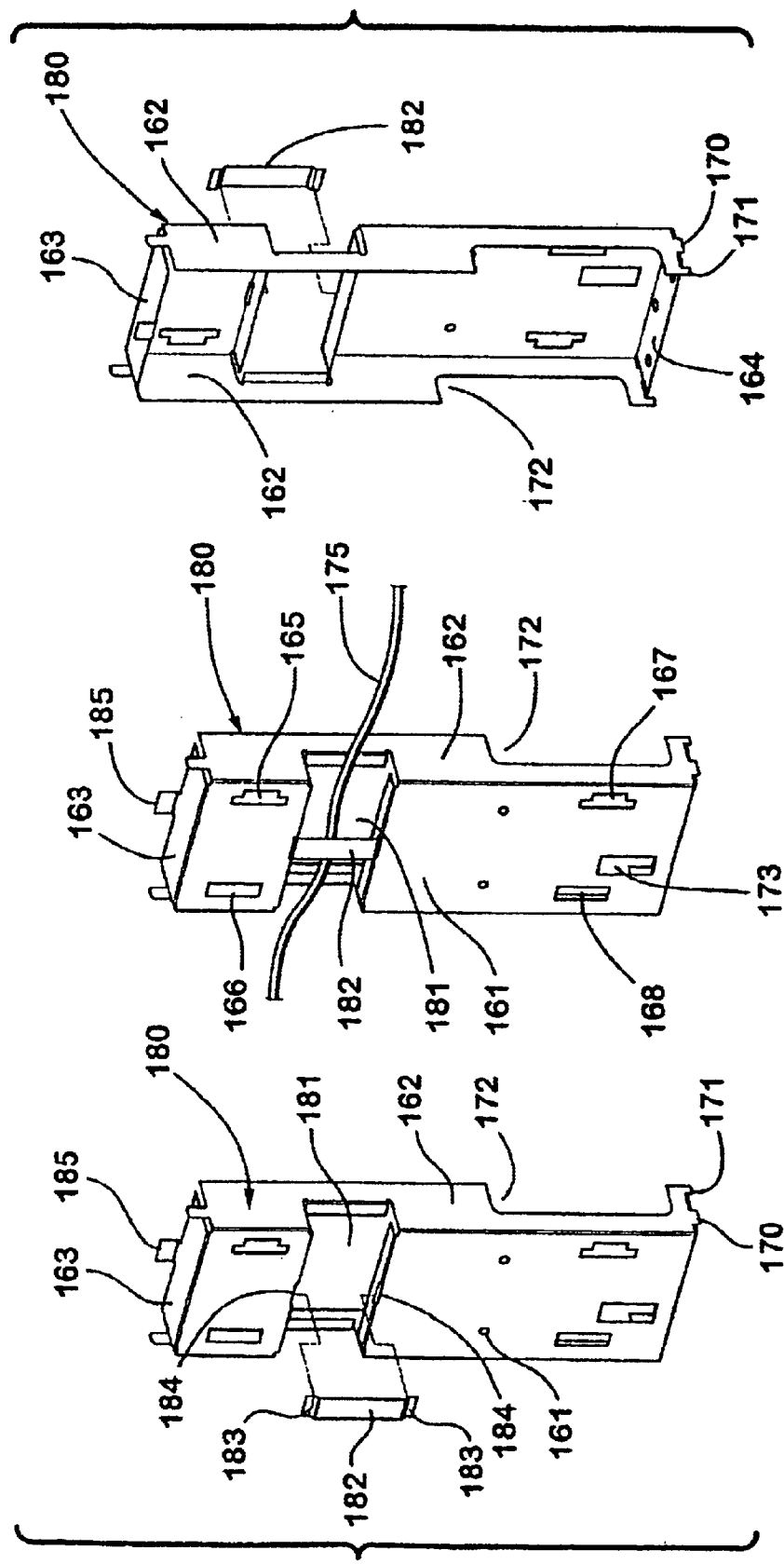
FIG. 24 is an exploded perspective view of another alternate embodiment of a cover panel mounting bracket.
FIG. 25 is a perspective view of the cover panel mounting bracket of FIG. 24.
FIG. 26 is an exploded perspective view of the cover panel mounting bracket of FIG. 24 from a rear side thereof.

Instead of the left and right hand cover panel brackets 52 and 53 discussed above, an alternate embodiment 160 of the cover panel bracket may be utilized in both a left hand and right hand configuration (i.e., on either side of a modular appliance unit). Cover panel bracket 160 includes a front web 161, a pair of vertically extending side webs 162, an upper web 163, and a lower web 164 forming a shallow "shoebox" shape. Mounting openings 165–168 through the front web 161 recite mounting clips to retain cover panels 10 adjacent an appliance unit. The openings 165–168, and cover panel mounting clips are described in detail in the above-identified co-pending application Ser. No. 10/077, 533, entitled PANEL SYSTEM, previously incorporated herein by reference. Side webs 162 are cut out at 172 to provide for routing of utility lines 175 therethrough to or from the adjacent appliance unit if required. With further reference to FIGS. 24–26, a second embodiment 180 of the bracket cover panel mounting bracket of FIGS. 22 and 23 is substantially the same as bracket 160, except that bracket 180 includes an enlarged cutout portion 181 through the front web 161 and side web 162 to permit lay-in of utility lines 175, such as data or power lines. A small strip 182 can be installed across the cutout 181 after the utility lines 175 are installed by placing the ends 183 of strip 182 in openings 184. The strip 182 provides a visual block between the edge of the cover panel 10 and the adjacent appliance unit, by extending across the gap between the appliance unit and the cover panel. An upwardly extending tab 185 similarly provides a light blocking function.

Figure 28:
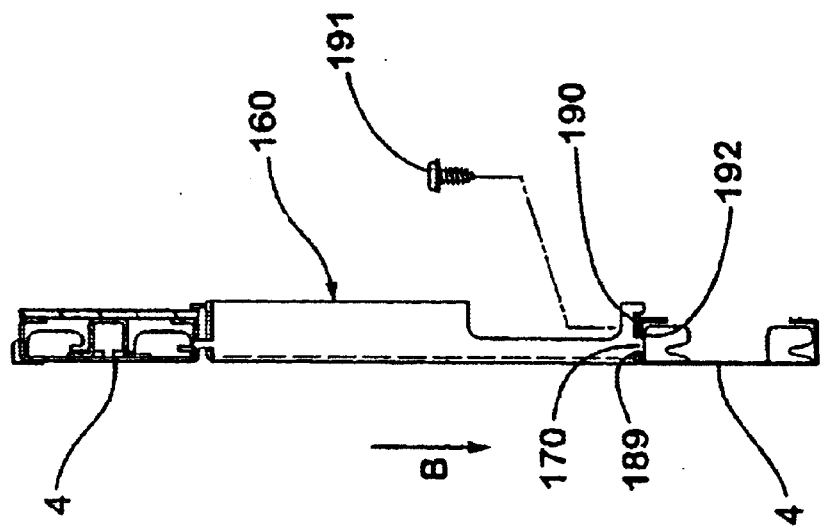
FIG. 28 is a side view of the bracket of FIG. 22 illustrating the installation of the bracket between a pair of horizontal beams.
Figure 27:
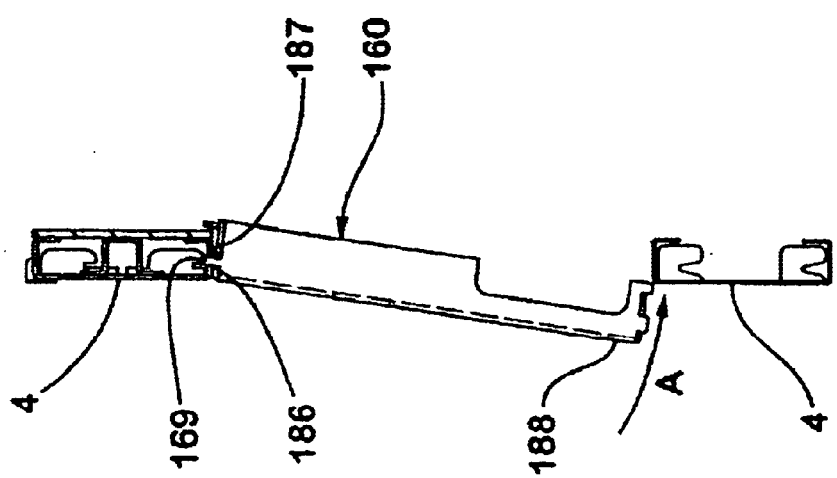
FIG. 27 is a side view of the bracket of FIG. 22 illustrating the installation of the bracket between a pair of horizontal beams.

With further reference to FIGS. 27 and 28, bracket 160 may be installed between a pair of adjacent beams 4 by first inserting upwardly extending tab 169 into an opening 186 in lower surface 187 of the uppermost beam 4. The lower end 188 of bracket 160 is then rotated inwardly in the direction of the arrow "A" (FIG. 27) until the bracket 160 is vertically aligned in the position illustrated in FIG. 28. The bracket 160 is then shifted downwardly in the direction of the arrow "B" to engage the tabs 170 in openings 189 in upper side 190 of the lower beam 4. A plurality of threaded fasteners 191 are then inserted through the openings 174 (FIG. 23) in the lower web 164 of bracket 160 and into the corresponding openings 192 in the upper side 190 of the lowermost bracket 4. Threaded fasteners 191 may be self-tapping screws, well-nuts, or other such conventional fastener. During installation of fasteners 191, the installer may utilize the access opening 173 and cutouts 172 to provide access for the wrench, screwdriver, or the like. The fasteners 191 ensure that the bracket 160 is rigidly secured to the beams 4, without rattles or the like. Bracket 180 is installed in substantially the same manner as just described for bracket 160.

The modular appliance units of the present invention permit various such units to be mounted within the partition panel itself, thereby reducing the worksurface space that would otherwise be required for such units. The intermediate beams 4 can be positioned at various vertical heights, and the modular appliance units can be secured to a pair of intermediate beams 4 at the selected vertical position. Alternately, the modular appliance units may be secured to an upper frame member 13 and an intermediate beam 4, or, the modular appliance unit may be secured to an intermediate beam 4 and the lower horizontal frame member 14. Still further, the modular appliance units can be positioned horizontally in a selected mounting space 32. Accordingly, the present invention permits a wide variety of modular appliance units to be positioned at virtually any horizontal or vertical position within the partition panels 2 utilizing a common mounting arrangement. The common mounting arrangement permits the various types of modular appliance units to be interchanged/moved as required. Furthermore, because the modular appliance units are mounted at standard positions, and have standard sizes, fill in panels having standard widths and heights can also be provided to quickly fill in any gaps between the modular appliance units and the adjacent vertical frame members.

In the foregoing description, it will be readily appreciated by those skilled in the art that modifications may be made to the invention without departing from the concepts disclosed herein. Such modifications are to be considered as included in the following claims, unless these claims by their language expressly state otherwise.

What is claimed is:

1. A freestanding partition panel for dividing a floor space, comprising:

a rigid partition frame having horizontally spaced apart vertical side frame members and vertically spaced apart first and second horizontal members extending between said vertical side frame members to form a generally quadrilateral vertically enlarged opening through said frame and defining an open space within said panel;

at least one intermediate horizontal cross member extending across said vertically enlarged opening and defining an upper opening through said frame above said intermediate horizontal cross member, and defining a lower opening through said frame below said intermediate horizontal cross member;

said intermediate horizontal cross member and at least a selected one of said first and second horizontal frame members including a plurality of horizontally spaced apart attachment locations defining a plurality of discrete, serially adjacent mounting spaces in a selected one of said upper and lower openings through said frame within said open space;

a modular appliance unit connectable to selected ones of said attachment locations of said intermediate horizontal cross member and said selected one of said first and second horizontal members, such that said utility unit can be mounted in a selected one of said mounting spaces, said appliance unit having a side edge spaced apart from a selected one of said vertical side frame members;

a first cover panel secured to said partition frame and extending horizontally between said side edge of said appliance unit and said selected vertical side frame member, said first cover panel connected to said intermediate horizontal cross member and extending vertically between said intermediate horizontal cross member and said selected one of said first and second members; and a second cover panel secured to said partition frame and extending horizontally between said vertical side frame members, said second cover panel extending vertically between said intermediate horizontal cross member and the other of said selected one of said first and second members.

2. The partition panel of claim 1, wherein:

said first horizontal member extends proximate an upper edge of said partition panel.

3. The partition panel of claim 2, wherein:

said second horizontal member extends proximate a lower edge of said partition panel.

4. The partition panel of claim 1, wherein:

said intermediate horizontal cross member comprises a first intermediate horizontal cross member; and including:

an upper horizontal frame member extending between and rigidly interconnecting said vertical side frame members, said first horizontal frame members including said plurality of horizontally spaced apart attachment locations and positioned below said upper horizontal frame member to define a second intermediate horizontal cross member, such that said mounting spaces are defined between said first and second intermediate horizontal cross members.

5. The partition panel of claim 1, including:

a cover panel mounting bracket connected to said intermediate horizontal cross member and to said selected one of said first and second horizontal frame members proximate said side edge of said appliance unit, said first cover panel having a vertical side edge of said appliance unit, said first cover panel including a connector proximate said vertical side edge secured to said cover panel mounting bracket.

6. The partition panel of claim 1, wherein:

said appliance unit comprises a power unit having a power receptacle outlet.

7. The partition panel of claim 1, wherein:

said appliance unit comprises a storage unit having vertically extending side walls and horizontally extending upper and lower walls defining an interior space, said storage unit further including a horizontal shelf extending between said vertical side walls.

8. The partition panel of claim 7, wherein:

said first and second cover panels have an exterior surface defining a vertical plane;

said horizontal shelf having an inner portion disposed within said interior space, and having an exterior portion extending horizontally outward of said vertical plane.

9. The partition panel of claim 1, wherein:

said attachment locations comprise threaded openings;

said appliance unit has a generally quadrilateral perimeter defining four corners; and including:

at least one threaded fastener proximate each corner received in said threaded openings to secure said appliance unit to said partition frame.

10. A freestanding partition panel for dividing a floor space, comprising:

a rigid partition frame having first and second horizontally spaced apart vertical side frame members, and elongated vertically spaced apart first and second horizontal members extending between said vertical side frame members to define an open space within said panel;

said first and second horizontal members including a plurality of horizontally spaced apart attachment locations defining a plurality of discrete, serially adjacent mounting spaces within said open space;

a modular appliance unit connectable to selected ones of said attachment locations of said first and second horizontal members and extending vertically between said first and second horizontal members; said appliance unit defining a generally vertical side edge horizontally spaced apart from said first vertical side frame member to define a gap therebetween; and a cover panel secured to said partition frame, said cover panel having a first vertical side edge proximate said vertical side edge of said appliance unit, and a second vertical side edge proximate said first vertical side frame member, said cover panel secured to said first and second horizontal members and extending therebetween to substantially close off said gap.

11. The partition panel of claim 10, including:

a cover panel bracket secured to said first and second horizontal members and extending therebetween proximate said vertical side edge of said appliance unit;

said cover panel including at least one connector proximate said first vertical side edge of said cover panel securing said cover panel to said cover panel bracket.

12. The partition panel of claim 11, wherein:

said attachment locations comprise threaded openings; and including:

a plurality of threaded fasteners securing said appliance unit and said cover panel bracket to said thread openings.

13. The partition panel of claim 11, wherein:

said cover panel includes at least one opening; and said at least one connector comprises a clip received in said opening to secure said cover panel to said cover panel bracket.

14. The partition panel of claim 10, wherein:

said cover panel comprises a first cover panel;

said gap comprises a first gap;

said vertical side edge of said appliance unit comprises a first vertical side edge;

said appliance unit having a second vertical side edge horizontally spaced from said second vertical side frame member to define a second gap therebetween; and a second cover panel secured to said partition frame and substantially closing off said second gap.

15. The partition panel of claim 10, including:

an upper horizontal frame member extending between and rigidly interconnecting said vertical side frame members, said upper horizontal frame member vertically spaced above a selected one of said first and second horizontal members to define an upper gap;

a lower horizontal frame member extending between and rigidly interconnecting said vertical side frame members, said lower horizontal frame member vertically spaced below the other one of said first and second horizontal members to define a lower gap;

an upper cover panel secured to said partition frame and closing off said upper gap; and a lower cover panel secured to said partition frame and closing off said lower gap.

16. The partition panel of claim 15, wherein:

said vertical side frame members, first and second horizontal members, and upper and lower horizontal frame members have a plurality of openings;

said upper and lower cover panels each including protruding connectors received in said openings to secure said upper and lower cover panels to said partition frame.

17. The partition panel of claim 10, wherein:

said appliance unit comprises a power unit having a power receptacle outlet.

18. The partition panel of claim 10, wherein:

said appliance unit comprises a storage unit having vertically extending side walls and horizontally extending upper and lower walls defining an interior space, said storage unit further including a horizontal shelf extending between said vertical side walls.

19. The partition panel of claim 18, wherein:

said first and second cover panels have an exterior surface defining a vertical plane;

said horizontal shelf having an inner portion disposed within said interior space, and having an exterior portion extending horizontally outward of said vertical plane.

20. A method of configuring a partition panel, comprising:

providing a freestanding partition frame defining horizontally spaced apart vertical side faces and an interior space between said vertical side faces, said partition frame having first and second generally vertical side edges that are horizontally spaced apart to define a frame width, said partition frame having generally horizontal upper and lower edges defining a generally quadrilateral perimeter with said vertical side edges;

dividing at least a portion of said interior space into a plurality of serially adjacent mounting spaces defining a horizontal row, said mounting spaces each having substantially the same size and configuration;

providing a plurality of modular appliance units, each configured to be mounted into a selected one of said mounting spaces at a selected horizontal position and having an exterior side surface that faces outwardly, a generally vertical side edge and generally horizontal upper and lower side edges defining a height;

securing said appliance unit to said portion frame in a selected one of said mounting spaces at a selected horizontal position with said vertical side edge of said appliance unit spaced inwardly from said first vertical side edge of said partition frame to form a first gap defining a width that is substantially less than said frame width, said upper side edge of said appliance unit spaced downwardly from said upper edge of said partition frame to form an upper gap having a width about the same as said frame width, said lower side edge of said utility unit spaced upwardly from said lower edge of said partition frame to form a lower gap having a width about the same as said frame width;

providing a first cover panel having a width substantially equal to said first gap, and a height substantially the same as the height of said utility unit;

installing said first cover panel to said partition frame to substantially close off said first gap;

installing an upper cover panel to substantially close off said upper gap; and installing a lower cover panel to substantially close off said lower gap.

21. The method of claim 20, wherein:

at least one of said appliance units includes a power receptacle, and at least one appliance unit includes a shelf.

22. The method of claim 20, wherein:

said vertical side edge of said appliance unit comprises a first vertical side edge, said appliance unit having a second generally vertical side edge;

said second vertical side edge spaced apart from said second vertical side edge of said partition frame to define a second gap; and including:

providing a second cover panel having width substantially equal to the height of said utility unit.

23. A freestanding partition panel for subdividing the floor space of a building interior, said partition panel comprising:

a plurality of interconnected structural members defining a partition frame configured to be supported on a floor surface, said partition panel having first and second major exterior surfaces disposed on opposite sides of said panel;

a first support member attached to said frame, said first support member attachable to said frame at a plurality of vertically spaced apart support member positions and wherein said first support member is disposed substantially between said first and second major exterior surfaces when attached in said plurality of support member positions;

at least one cover panel defining a first portion of said major exterior surface and having a generally quadrilateral perimeter defining a cover panel height; and an appliance unit mounted on said partition panel and secured to said first support member, said appliance unit defining a second portion of said first major exterior surface, said second portion having a perimeter defining an appliance unit height, said perimeters being mutually adjacently positioned for a partial vertical length of said outermost perimeter, said cover panel height and said appliance unit height being substantially equal, said appliance unit being securable to said first support member at a plurality of horizontally spaced appliance positions on said first support member and wherein said appliance unit is mountable at a plurality of horizontally and vertically spaced apart installation positions on said partition panel, said appliance unit being vertically repositionable by vertically repositioning said first support member, and said appliance unit being horizontally repositionable by repositioning said appliance on said first support member.

24. The partition panel of claim 23, wherein:

said appliance unit is directly secured to both said frame and said first support member.

25. The partition panel of claim 23, further comprising:
a repositionable second support member and wherein said appliance unit is secured to each of said first and second support members.

26. The partition panel of claim 23, wherein:
said first support member is an elongate member having opposite ends attachable to said frame proximate said support member positions, said plurality of appliance positions being spaced between said first and second ends.

27. The partition panel of claim 26, wherein:
said frame defines a rectilinear shape and said first support member is positioned parallel to at least one edge of said rectilinear shape.

28. The partition panel of claim 27, wherein:
said appliance unit is directly secured to both said first support member and said frame and is positioned between said first support member and said frame.

29. The partition panel of claim 27, further comprising:
a second support member extending parallel to said first support member, said appliance unit being securable to said second support member and wherein said appliance unit is positioned between said first and second support members.

30. The partition panel of claim 27, further comprising:
a second repositionable support member extending parallel to said first support member, said appliance being securable to said second support member and wherein said appliance unit is positioned between said first and second support members, said first and second support members being positioned inwardly from said parallel edges; and
said partition panel further comprising a second cover member defining a portion of said first major surface and wherein said first and second cover members are respectively secured to said first and second support members and are positioned on opposite sides of said appliance unit.

31. The partition panel of claim 23, further comprising:
a second cover panel defining at least a portion of said first major surface.

32. The partition panel of claim 23, further comprising:
a vertically repositionable second support member extending parallel to said support member, said support members subdividing said first major surface into a plurality of vertical segments, each of said vertical segments having a vertical dimension substantially equivalent to a selected one of said common vertical dimension and a multiple of said common vertical dimension.

33. The partition panel of claim 32, further comprising:
a second cover panel defining at least a portion of said first major surface.

34. The partition panel of claim 23, wherein:
said appliance unit comprises an articulating support arm for a flat screen display.

35. The partition panel of claim 23, further comprising:
a second appliance unit, said second appliance unit defining a portion of said second major exterior surface and wherein said panel interior is divisible by a centerline plane and comprises a first half located between said centerline plane and said first major exterior surface and a second half located between said centerline plane and said second major exterior surface and wherein each of said appliances is configured to be disposed within only one of said panel interior halves whereby said appliances are positionable directly opposite each other.

36. A freestanding partition panel for subdividing the floor space of a building interior, said partition panel comprising:
a plurality of interconnected structural members defining a frame of said partition panel, said partition panel having first and second major exterior surfaces disposed on opposite sides of said panel and defining a panel interior therebetween;
a repositionable first support member attached to said frame, said first support member attachable to said frame at a plurality of support member positions spaced apart in a first direction and wherein said first support member is disposed substantially between said first and second major surfaces when attached in said plurality of support member positions;
a cover panel support bracket detachably secured to said first support member and extending in said first direction;
an appliance unit mounted on said partition panel and secured to said first support member, said appliance defining a portion of said first major surface;
at least one cover member mounted on said partition panel and secured to said cover panel support bracket, said cover member defining at least a portion of said first major surface and positioned adjacent said appliance, said cover member overlaying a portion of said cover panel support bracket, wherein said cover member and said appliance unit define a common edge therebetween, said common edge extending in said first direction and at least one end of said common edge terminating at a point located on said first major surface inwardly of said structural members, said cover panel support bracket extending along substantially a full length of said common edge.

37. The partition panel of claim 36, wherein:
said plurality of interconnected structural members define a rectilinear frame and said first support member extends across said frame parallel to a first one of said structural members and said cover panel support bracket extends from said first support member to said first structural member.

38. The partition panel of claim 37, wherein:
said cover panel support bracket includes mounting features for attaching said cover member.

39. The partition panel of claim 38, wherein:
said mounting features comprise apertures and said cover member includes spring clips engageable with said apertures.

40. The partition panel of claim 36, wherein:
said plurality of interconnected structural members define a rectilinear frame and said first support member extends across said frame parallel to a first one of said structural members and said partition panel further comprises a second repositionable support member extending across said frame parallel to said first structural member, said cover panel support bracket extending from said first support member to said second support member.

41. The partition panel of claim 40, wherein:
said first and second support members extend vertically and are horizontally repositionable and said cover panel support bracket extends horizontally between said support members.

42. The partition panel of claim 40, wherein:
said first and second support members extend vertically and are vertically repositionable and said cover panel support bracket extends vertically between said support members.

43. The partition panel of claim 42, wherein:
said cover panel support bracket includes mounting features for attaching said cover member.

44. The partition panel of claim 43, wherein:
said mounting features comprise apertures and said cover member includes spring clips engageable with said apertures.

45. The partition panel of claim 42, wherein:
said cover panel support bracket is repositionable at spaced horizontal positions on said first and second support members.

46. The partition panel of claim 36, further comprising:
a second appliance unit, said second appliance unit defining a portion of said second major exterior surface and wherein said panel interior is divisible by a centerline plane and comprises a first half located between said centerline plan and said first major exterior surface and a second half located between said centerline plane and said second major exterior surface and wherein each of said appliance units is configured to be disposed within only one of said panel interior halves whereby said appliance units are positionable directly opposite each other.

47. A freestanding partition panel for subdividing the floor space of a building interior, said partition panel comprising:
a plurality of interconnected structural members defining a partition frame configured to be supported on a floor surface, said partition panel having first and second major exterior surfaces disposed on opposite sides of said panel;
a first support member attached to said frame, said first support member attachable to said frame at a plurality of vertically spaced apart support member positions and wherein said first support member is disposed substantially between said first and second major exterior surfaces when attached in said plurality of support member positions;
at least one cover panel defining a first portion of said major exterior surface and having a generally quadrilateral perimeter defining a cover panel height;
a first appliance unit mounted on said partition panel and secured to said first support member, said first appliance unit defining a second portion of said first major exterior surface, said second portion having a perimeter defining an appliance unit height, said perimeter being mutually adjacently positioned for a partial vertical length of said outermost perimeter, said cover panel height and said appliance unit height being substantially equal, said first appliance unit being securable to said first support member at a plurality of horizontally spaced appliance positions on said first support member and wherein said first appliance unit is mountable at a plurality of horizontally and vertically spaced apart installation positions on said partition panel, said first appliance unit being vertically repositionable by vertically repositioning said first support member, and said first appliance unit being horizontally repositionable by repositioning said first appliance unit on said first support member; and
a second appliance unit, said second appliance unit defining a portion of said second major exterior surface and wherein said panel interior is divisible by a centerline plane and comprises a first half located between said centerline plane and said first major exterior surface and a second half located between said centerline plane and said second major exterior surface and wherein each of said first and second appliances is configured to be disposed within only one of said panel interior halves whereby said first and second appliances are positionable directly opposite each other.

48. A freestanding partition panel for subdividing the floor space of a building interior, said partition panel comprising:
a plurality of interconnected structural members defining a frame of said partition panel, said partition panel having first and second major exterior surfaces disposed on opposite sides of said panel and defining a panel interior therebetween;
a repositionable first support member attached to said frame, said first support member attachable to said frame at a plurality of support member positions spaced apart in a first direction and wherein said first support member is disposed substantially between said first and second major surfaces when attached in said plurality of support member positions;
a cover panel support bracket detachably secured to said first support member and extending in said first direction;
a first appliance unit mounted on said partition panel and secured to said first support member, said first appliance unit defining a portion of said first major surface;
at least one cover member mounted on said partition panel and secured to said cover panel and support bracket, said cover member defining at least a portion of said first major surface and positioned adjacent said appliance, said cover member overlaying a portion of said cover panel support bracket, wherein said cover member and said first appliance unit define a common edge therebetween, said common edge extending in said first direction and at least one end of said common edge terminating at a point located on said first major surface inwardly of said structural members, said cover panel support bracket extending along substantially a full length of said common edge; and
a second appliance unit, said second appliance unit defining a portion of said second major exterior surface and wherein said panel interior is divisible by a centerline plane and comprises a first half located between said centerline plane and said first major exterior surface and a second half located between said centerline plane and said second major exterior surface and wherein each of said first and second appliance units is configured to be disposed within only one of said panel interior halves whereby said first and second appliance units are positionable directly opposite each other.

* * * * *